(12) United States Patent
Uchida

(10) Patent No.: US 10,901,671 B2
(45) Date of Patent: Jan. 26, 2021

(54) PRINTING SYSTEM, PRINTING APPARATUS, AND METHOD FOR CONTROLLING PRINTING SYSTEM

(71) Applicant: SEIKO EPSON CORPORATION, Tokyo (JP)

(72) Inventor: Junpei Uchida, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/711,267

(22) Filed: Dec. 11, 2019

(65) Prior Publication Data

US 2020/0192618 A1 Jun. 18, 2020

(30) Foreign Application Priority Data

Dec. 12, 2018 (JP) ................................ 2018-232879

(51) Int. Cl.
*G06F 3/12* (2006.01)
(52) U.S. Cl.
CPC .......... *G06F 3/1268* (2013.01); *G06F 3/1236* (2013.01); *G06F 3/1238* (2013.01); *G06F 3/1288* (2013.01)
(58) Field of Classification Search
None
See application file for complete search history.

(56) References Cited

U.S. PATENT DOCUMENTS

| 2012/0081731 A1* | 4/2012 | Suzuki | G06F 3/1247 358/1.13 |
| 2014/0063548 A1* | 3/2014 | Nagai | G06F 3/1273 358/1.15 |
| 2019/0065128 A1* | 2/2019 | Sakurai | G06F 3/1288 |

FOREIGN PATENT DOCUMENTS

JP 2015-104900 6/2015

* cited by examiner

*Primary Examiner* — Frantz Bataille
(74) *Attorney, Agent, or Firm* — Workman Nydegger

(57) ABSTRACT

A PC that generates a print job, a server, and a plurality of printers are included. The print job generated by the PC is stored in any of the plurality of the printers and the server. When a print target job targeted for printing is designated on a printer of the plurality of printers among one or more print jobs stored in the server and the printer, in the case in which the print target job is stored in the printer per se, the printer prints in accordance with the print target job; and in the case in which the print target job is not stored in the printer per se, the printer obtains from the server the print target job stored in the server and prints in accordance with the obtained print target job.

9 Claims, 17 Drawing Sheets

PRINTING SYSTEM, PRINTING APPARATUS, AND METHOD FOR CONTROLLING PRINTING SYSTEM

The present application is based on, and claims priority from JP Application Serial Number 2018-232879, filed Dec. 12, 2018, the disclosure of which is hereby incorporated by reference herein in its entirety.

BACKGROUND

1. Technical Field

The present disclosure relates to a printing system, a printing apparatus, and a method for controlling a printing system that are used for printing in accordance with a print job.

2. Related Art

As described in JP A-2015-104900, a printing system involving a management server for managing job information regarding print jobs and a plurality of printing apparatuses is known. In this printing system, when a print job is sent to a first printing apparatus that is any printing apparatus of the plurality of printing apparatuses, the first printing apparatus stores the print job and sends collation information regarding the print job to the management server. Afterwards, when authentication succeeds on a second printing apparatus other than the first printing apparatus among the plurality of printing apparatuses, in the case in which the print job stored in the first printing apparatus is designated as a print target, the second printing apparatus obtains the print job from the first printing apparatus via the management server in accordance with the collation information managed by the management server and accordingly prints.

The known printing system has a problem in which printing is not performed in accordance with a print job when the first printing apparatus or the management server that stores the print job is unusable, although the known printing system involves the plurality of printing apparatuses.

SUMMARY

A printing system according to an aspect of the present disclosure includes a print control apparatus that generates a print job, a print server, and a plurality of printing apparatuses. The print job generated by the print control apparatus is stored in any of the plurality of printing apparatuses and the print server. On a designated printing apparatus that is a printing apparatus of the plurality of printing apparatuses, a print target job targeted for printing is designated among one or more print jobs stored in the print server and the printing apparatus storing the print job. When the print target job is stored in the designated printing apparatus, the designated printing apparatus prints in accordance with the print target job. When the print target job is not stored in the designated printing apparatus, the designated printing apparatus obtains from the print server the print target job stored in the print server and prints in accordance with the obtained print target job.

A printing apparatus according to another aspect of the present disclosure includes a control unit and a printing unit. When the control unit receives a print job from a print control apparatus, the control unit stores the received print job in the printing apparatus and sends the received print job to a print server to cause the print server to store the received print job, and when a print target job targeted for printing is designated among print jobs, each being the print job stored in the print server and the printing apparatus, in the case in which the print target job is stored in the printing apparatus per se, the control unit causes the printing unit to print in accordance with the print target job stored in the printing apparatus; and in the case in which the print target job is not stored in the printing apparatus per se, the control unit obtains from the print server the print target job stored in the print server and causes the printing unit to print in accordance with the obtained print target job.

In a method for controlling a printing system according to still another aspect of the present disclosure, the printing system includes a print control apparatus that generates a print job, a print server, and a plurality of printing apparatuses. The print job generated by the print control apparatus is stored in any of the plurality of printing apparatuses and the print server. On a designated printing apparatus that is a printing apparatus of the plurality of printing apparatuses, a print target job targeted for printing is designated among one or more print jobs stored in the print server and the printing apparatus storing the print job. When the print target job is stored in the designated printing apparatus, the designated printing apparatus prints in accordance with the print target job. When the print target job is not stored in the designated printing apparatus, the designated printing apparatus obtains from the print server the print target job stored in the print server and prints in accordance with the obtained print target job.

DESCRIPTION OF EXEMPLARY EMBODIMENTS

First Embodiment

Figure 1:
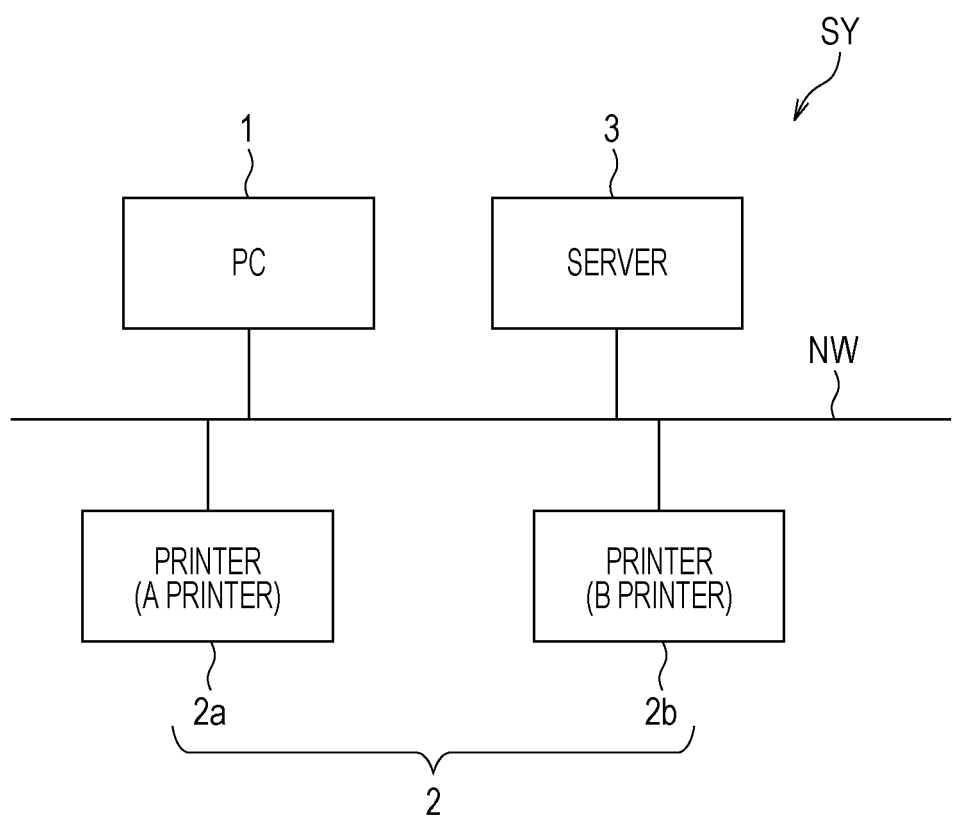
FIG. 1 is a diagram of a system configuration of a printing system.

Hereinafter, a printing system, a printing apparatus, and a method for controlling the printing system according to one embodiment is described with reference to the accompanying drawings. FIG. 1 is a diagram of a system configuration of a printing system SY according to a first embodiment. The printing system SY includes at least one personal computer (PC) 1, at least one printer 2, a server 3, and a network NW that connects these to each other. FIG. 1 indicates the printing system SY including one PC 1 and two printers 2. The PC 1 is an example of a "print control apparatus", the printer 2 is an example of a "printing apparatus", and the server 3 is an example of a "print server". As the network NW, for example, a local area network (LAN) or the Internet communication network can be used.

The PC 1 generates a print job and sends the generated print job. In this embodiment, the PC 1 sends the print job to a destination that is any of the printers 2 connected to the network NW. In this embodiment, two printers of an A printer 2a and a B printer 2b, which are the printers 2 capable of being designated as destinations by the PC 1, are connected to the network NW.

The printer 2 implements an authenticated printing function and performs user authentication. When a user desires to perform authenticated printing, the user firstly designates the printer 2 and provides a printing instruction by using the PC 1. Afterwards, the user visits the installation location of the printer 2 and performs an operation for authentication. The user performs the operation for authentication by, for example, holding their identification (ID) card over a card reader 22 (refer to FIG. 3) of the printer 2. The printer 2 performs user authentication in accordance with information that is read from the ID card; and when the authentication succeeds, the printer 2 displays all print jobs corresponding to the information that is read from the ID card in the form of a list used for designating a print job. Hereinafter, the list used for designating a print job is referred to as a "print job designation list". The print job designation list is an example of a "print job designation list for a user". The printer 2 prints in accordance with a print job designated by a user in the displayed print job designation list.

The server 3 stores a print job sent by the PC 1 and sends the stored print job to the printer 2 in response to a request from the printer 2. In this embodiment, after the PC 1 sends a print job to the printer 2, the printer 2, to which the print job is sent, stores the print job in the printer 2 per se and sends the print job to the server 3. The server 3 stores in itself the print job sent by the printer 2. Afterwards, when the operation for authentication and an operation for designating a print job are performed on the printer 2, the printer 2 determines whether the designated print job is stored in the printer 2 per se. When the designated print job is stored in the printer 2, the printer 2 prints in accordance with the print job stored in the printer 2 per se. In contrast, when the designated print job is not stored in the printer 2, the printer 2 requests the server 3 to send the designated print job. In response to the request, the server 3 sends the print job stored in the server 3 per se to the printer 2 that has submitted the request. The printer 2 receives the print job from the server 3 and prints in accordance with the received print job.

Figure 2:
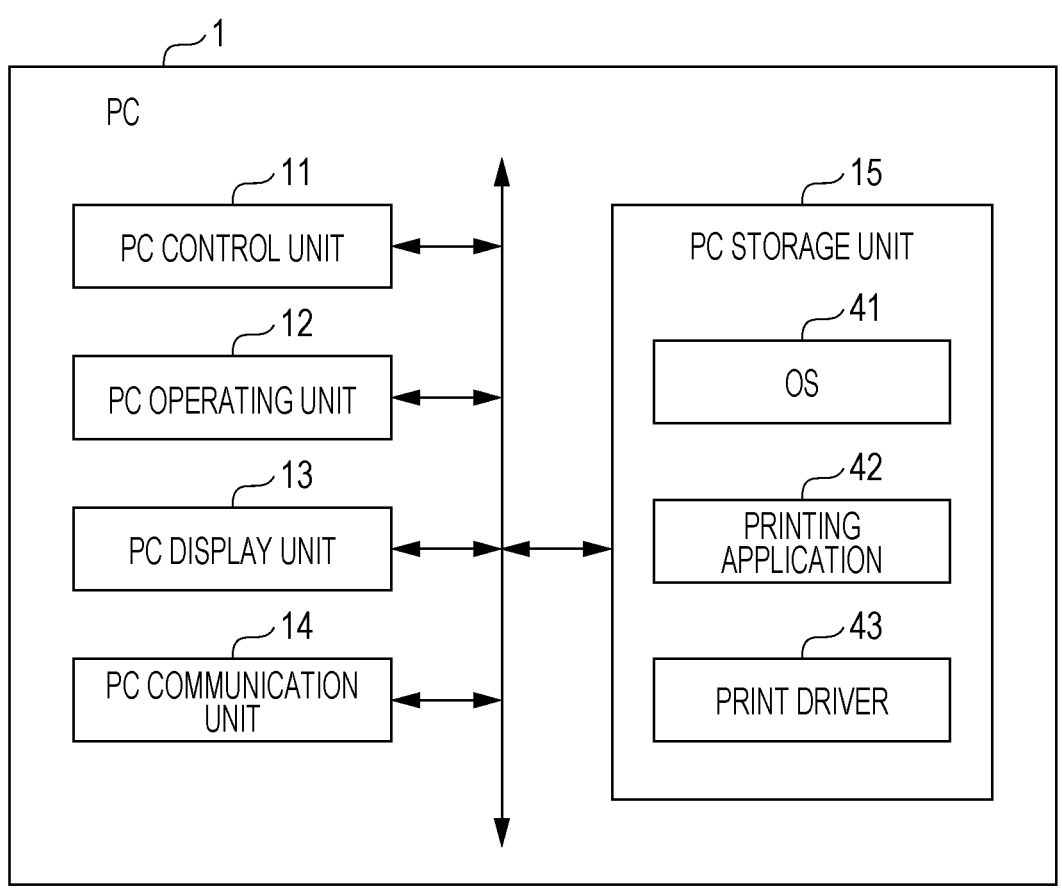
FIG. 2 is a block diagram illustrating a hardware configuration of a personal computer (PC).

FIG. 2 is a block diagram illustrating a hardware configuration of the PC 1. The PC 1 includes a PC control unit 11, a PC operating unit 12, a PC display unit 13, a PC communication unit 14, and a PC storage unit 15.

The PC control unit 11 includes a processor such as a central processing unit (CPU) and also includes, for example, a read-only memory (ROM) and a random-access memory (RAM). The PC control unit 11 controls the units in the PC 1. The PC operating unit 12 is implemented as, for example, a keyboard and a mouse and used by the user to perform various kinds of operations such as an operation for a printing application 42 and an instruction for printing provided for the printer 2. The PC display unit 13 is implemented as, for example, a liquid crystal display and displays various kinds of information such as information indicating a screen for displaying the printing application 42. The PC communication unit 14 communicates with the printer 2 and the server 3 via the network NW.

The PC storage unit 15 is implemented as, for example, a hard disk drive (HDD) and stores an operating system (OS) 41, the printing application 42, and a print driver 43. The OS 41 is fundamental software used for running various kinds of application programs such as the printing application 42 and the print driver 43. The printing application 42 is an application program for creating an image and/or a document targeted for printing.

The print driver 43 is a control program for performing print control for the printer 2. The print control is, for example, generating print data that is based on a command system and that is readable by the printer 2. The PC control unit 11 receives designation of the printer 2 as a destination of a print job and an instruction for printing from the user in accordance with the print driver 43. The PC control unit 11 also adds identification information for identifying a particular user to the print job in accordance with the print driver 43 and sends, to the printer 2 designated as a destination, the print job to which the identification information is added. The PC control unit 11 may generate a print job containing identification information instead of adding the identification information to the print job.

Figure 3:
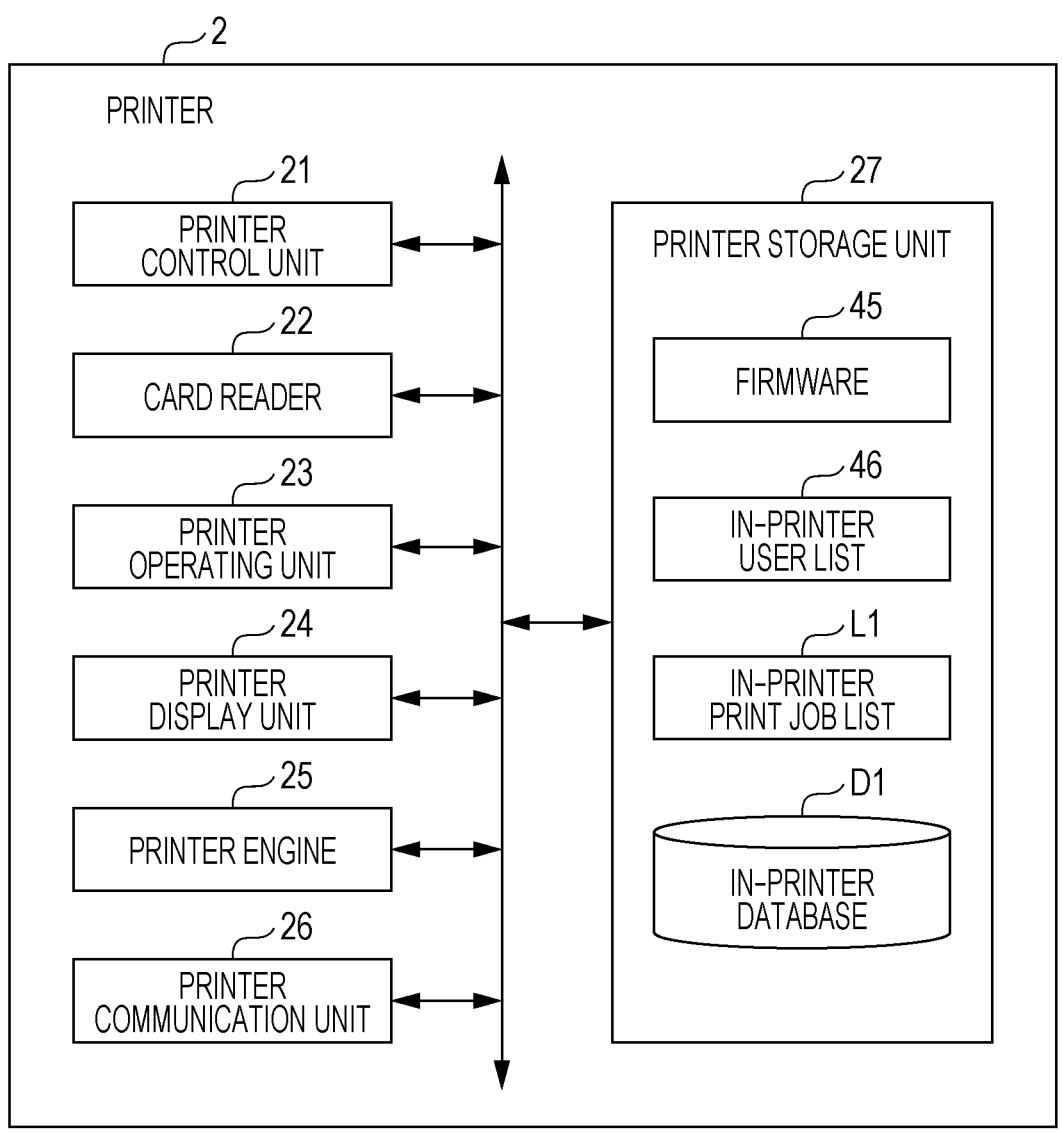
FIG. 3 is a block diagram illustrating a hardware configuration of a printer.

FIG. 3 is a block diagram illustrating a hardware configuration of the printer 2. The printer 2 includes a printer control unit 21, the card reader 22, a printer operating unit 23, a printer display unit 24, a printer engine 25, a printer communication unit 26, and a printer storage unit 27. The printing method of the printer 2 can be any manner; an ink jet method, an electrophotographic method, a thermal ink-transfer printing method, and a thermal printing method can be considered as examples. The printer control unit 21 is an example of a "control unit" and the printer engine 25 is an example of a "printing unit".

The printer control unit 21 includes, for example, a processor such as a CPU, a ROM, and a RAM and controls the units in the printer 2. The card reader 22 reads a user's ID card. The printer control unit 21 performs user authentication in accordance with information that is read by the card reader 22.

In this embodiment, it is assumed that the printer control unit 21 obtains, by reading an ID card with use of the card reader 22, ID information that can be associated with a user ID described later. The ID information is an example of "information obtained from a user".

The printer operating unit 23 is used for performing various kinds of operations performed on the printer 2 by the user. The various kinds of operations include, for example, an authentication operation performed by using a key input. The printer display unit 24 displays various kinds of information such as the print job designation list. In this embodiment, the printer display unit 24 displays as the print job designation list the designation list for a printer L3 (refer to FIG. 7) and a designation list for a server L4 (refer to FIG. 8). The designation list for a printer L3 is a list used for designating a print job stored in the printer 2 on which the user has performed the authentication operation. The designation list for a server L4 is a list used for designating a print job not stored in the printer 2 on which the user has performed the authentication operation.

The printer engine 25 is a printing mechanism for printing on a print medium such as a copy sheet. For example, when the printer 2 is an ink jet printer, the printer engine 25 includes, for example, an ink jet head, a head drive mechanism, and a print medium transporting mechanism. The printer communication unit 26 communicates with the PC 1 and the server 3 via the network NW.

The printer storage unit 27 is, for example, a flash memory and stores firmware 45, an in-printer user list 46, an in-printer print job list L1, and an in-printer database D1. The firmware 45 is an example of a "program".

The firmware 45 is a control program for controlling the printer 2. The printer control unit 21 performs, for example, control for communicating with the PC 1 and the server 3 and print control for the printer engine 25 in accordance with the firmware 45. In accordance with the firmware 45, the printer control unit 21 also performs user authentication and generates the in-printer print job list L1.

The in-printer user list 46 is a list in which a user ID, identification information, and ID information are recorded in association with each other in regard to a particular user who can use the printing system SY. The printer control unit 21 determines that user authentication succeeds when the in-printer user list 46 includes a particular item of ID information obtained by reading an ID card with use of the card reader 22. The user authentication may be performed by not reading an ID card with use of the card reader 22 but obtaining a user ID and a password entered by key inputs. In this case, the password is stored in association with the user ID in the in-printer user list 46.

Figure 5:
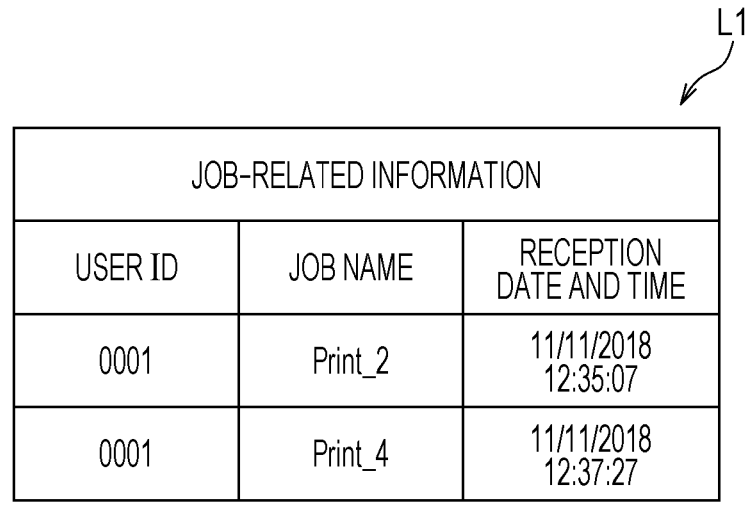
FIG. 5 illustrates an example of an in-printer print job list.

The in-printer print job list L1 is a list of print jobs that are sent by the PC 1. FIG. 5 illustrates an example of the in-printer print job list L1. It is assumed that the in-printer print job list L1 illustrated in FIG. 5 is stored in the B printer 2b. The in-printer print job list L1 stores job-related information for each print job. The job-related information contains a user ID, a job name, and a reception date and time. In the in-printer user list 46, the user ID is associated with identification information added to a corresponding print job. This means that, when the printer control unit 21 receives a print job, the printer control unit 21 refers to the in-printer user list 46, reads a user ID corresponding to identification information added to the print job, and records the user ID in the in-printer print job list L1. The job name is a name assigned to a corresponding print job. The reception date and time is a date and time when the printer 2 receives a corresponding print job from the PC 1. For example, the topmost row of the in-printer print job list L1 illustrated in FIG. 5 indicates that the B printer 2b receives a print job of the job name "Print 2" assigned the user ID "001" at 12:35:07 on Nov. 11, 2018. As described above, in the in-printer print job list L1 stored in the B printer 2b, only print jobs sent to the B printer 2b as a destination are targeted and stored.

The in-printer database D1 is a database that stores print jobs sent by the PC 1. When the in-printer database D1 is stored in the B printer 2b, only print jobs destined for the B printer 2b are stored in the in-printer database D1. After printing is performed in accordance with a print job stored in the in-printer database D1 of the printer 2, the printer control unit 21 deletes not only the targeted print job in the in-printer database D1 but also information about the targeted print job in the in-printer print job list L1. Similarly, when the printer control unit 21 receives an instruction for deleting a print job from the server 3, the printer control unit 21 deletes not only the targeted print job in the in-printer database D1 but also information about the targeted print job in the in-printer print job list L1.

Figure 4:
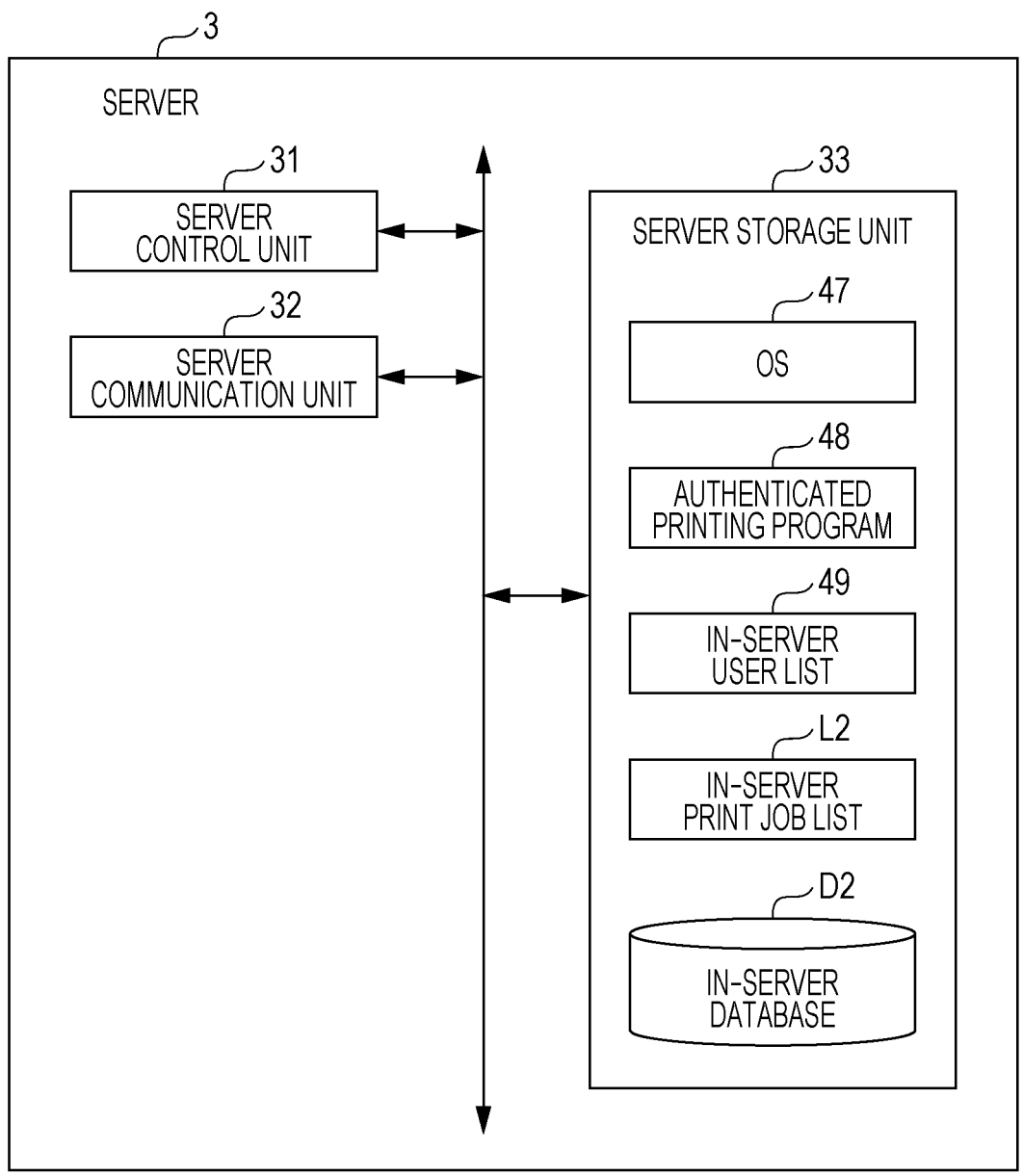
FIG. 4 is a block diagram illustrating a hardware configuration of a server.

FIG. 4 is a block diagram illustrating a hardware configuration of the server 3. The server 3 includes a server control unit 31, a server communication unit 32, and a server storage unit 33.

The server control unit 31 includes, for example, a processor such as a CPU, a ROM, and a RAM and controls the units in the server 3. The server communication unit 32 communicates with the PC 1 and the printer 2 via the network NW.

The server storage unit 33 is, for example, an HDD and stores an OS 47, an authenticated printing program 48, an in-server user list 49, an in-server print job list L2, and an in-server database D2. The OS 47 is fundamental software used for running application programs such as the authenticated printing program 48. The authenticated printing program 48 is an application program used for performing authenticated printing. In accordance with the authenticated printing program 48, the server control unit 31 performs control for communicating with the PC 1 and the printer 2 and generates the in-server print job list L2.

The in-server user list 49 is a list in which a user ID and identification information are recorded in association with each other in regard to a particular user who can use the printing system SY.

The in-server print job list L2 is a list targeting all print jobs sent by the PC 1. As described above, the printer 2 receives a print job from the PC 1 and sends the received print job to the server 3. The server control unit 31 generates the in-server print job list L2 in regard to print jobs that are sent by the respective printers 2 in the printing system SY. At this time, the server control unit 31 refers to the in-server user list 49, reads a user ID corresponding to identification information added to a corresponding print job, and records the user ID in the in-server print job list L2.

Figure 6:
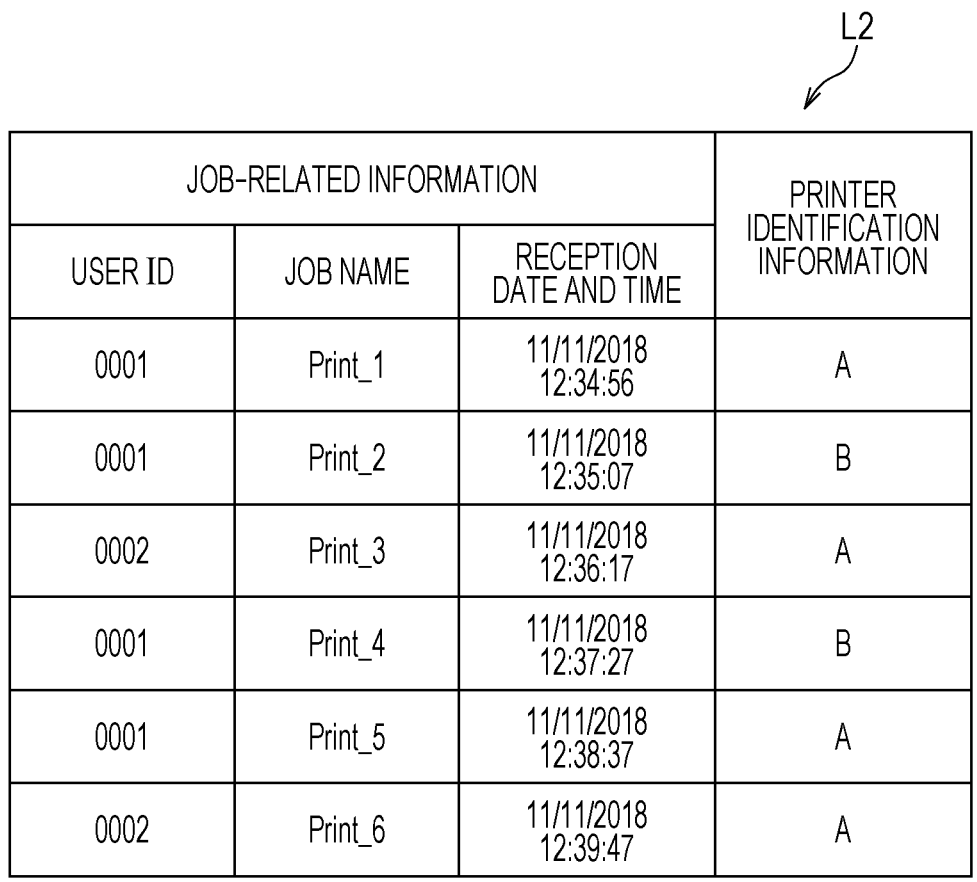
FIG. 6 illustrates an example of an in-server print job list.

FIG. 6 illustrates an example of the in-server print job list L2. The in-server print job list L2 stores job-related information and printer identification information in association with each other for each print job. Among these kinds of information, the printer identification information is information for identifying the printer 2 that is the source of a print job. The server 3 stores a printer table in which an IP address and printer identification information of the printer 2 are associated with each other and judges the printer identification information in accordance with the IP address of the printer 2 that is the source of a print job. In FIG. 6, the printer identification information of the A printer 2a indicates "A" and the printer identification information of the B printer 2b indicates "B". In this manner, in the in-server print job list L2, print jobs obtained by the server 3 from all the printers 2 included in the printing system SY are recorded.

Figure 7:
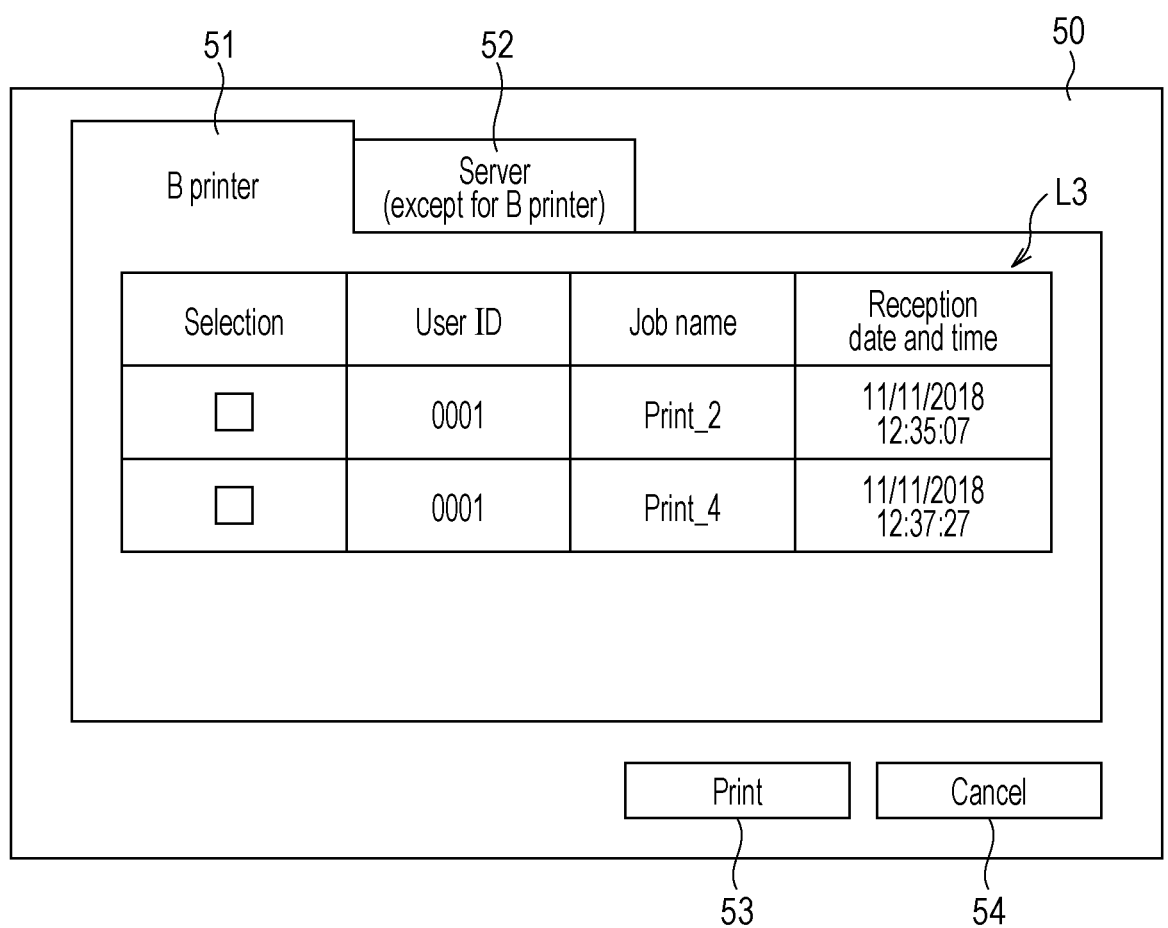
FIG. 7 illustrates an example of a print job designation screen when a printer tab is selected.
Figure 8:
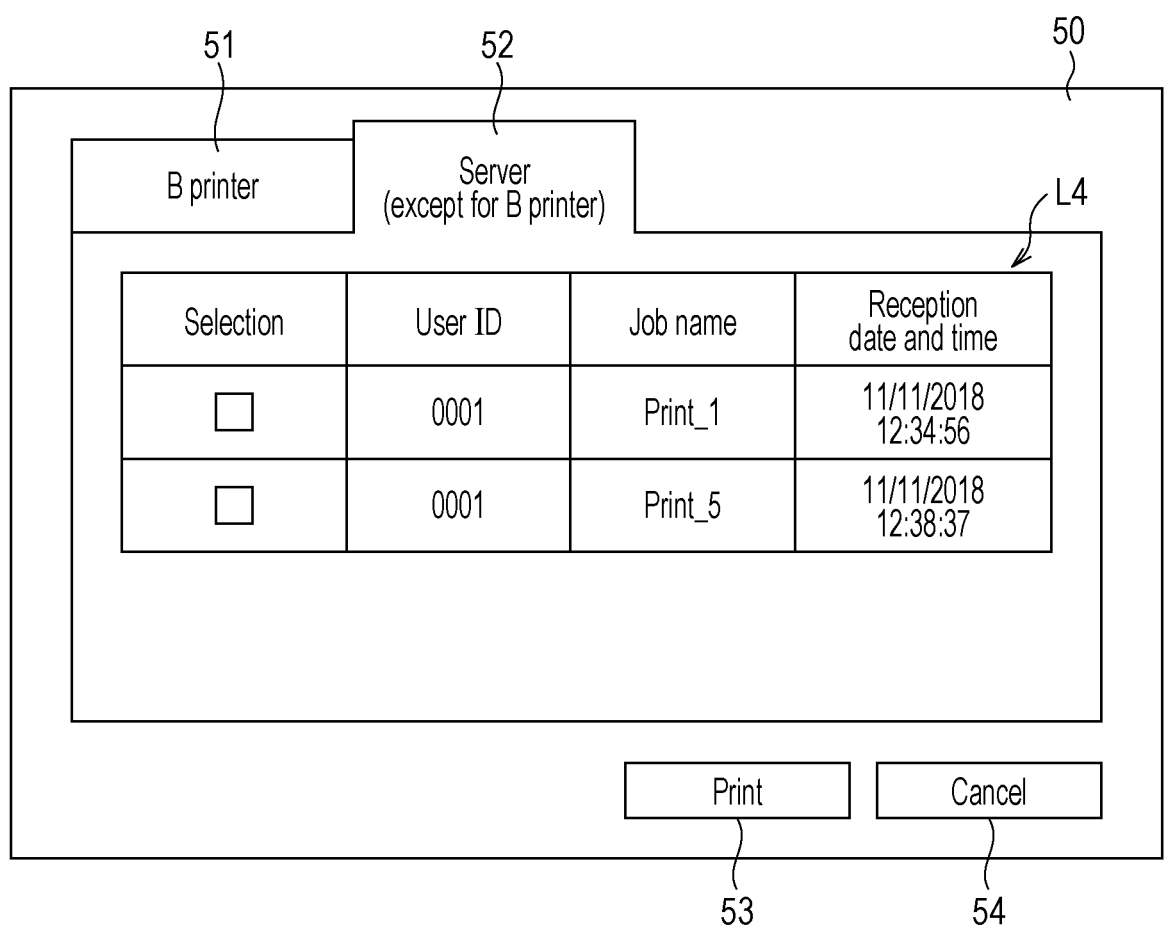
FIG. 8 illustrates another example of the print job designation screen when a server tab is selected.

FIGS. 7 and 8 illustrate examples of a print job designation screen 50 on which the designation list for a printer L3 and the designation list for a server L4 are displayed. FIGS. 7 and 8 depict examples of display when the user of the user ID "0001" has accomplished authentication on the B printer 2b. As illustrated in both drawings, the print job designation screen 50 displays the designation list for a printer L3, which is displayed by selecting a printer tab 51, or the designation list for a server L4, which is displayed by selecting a server tab 52, and a first print button 53 and a first cancel button 54.

As illustrated in FIG. 7, the designation list for a printer L3 is a list formed by extracting print jobs assigned the user ID "0001" from print jobs recorded in the in-printer print job list L1 (refer to FIG. 5). As illustrated in FIG. 8, the designation list for a server L4 is a list formed by excluding the print jobs included in the designation list for a printer L3 from print jobs assigned the user ID "0001" among print jobs recorded in the in-server print job list L2 (refer to FIG. 6). The user designates a particular print job as a print target in the designation list for a printer L3 or the designation list for a server L4 that are displayed on the print job designation screen 50.

In both the designation list for a printer L3 and the designation list for a server L4, a selection box, a user ID, a job name, and a reception date and time are displayed in association with each other. When the user selects a particular selection box of selection boxes corresponding to respective print jobs and also selects a first print button 53, the printer control unit 21 prints in accordance with the targeted particular print job. When the user selects the first cancel button 54, the state in which a selection box is selected is cancelled and the print job designation screen 50 turns invisible.

Figure 9:
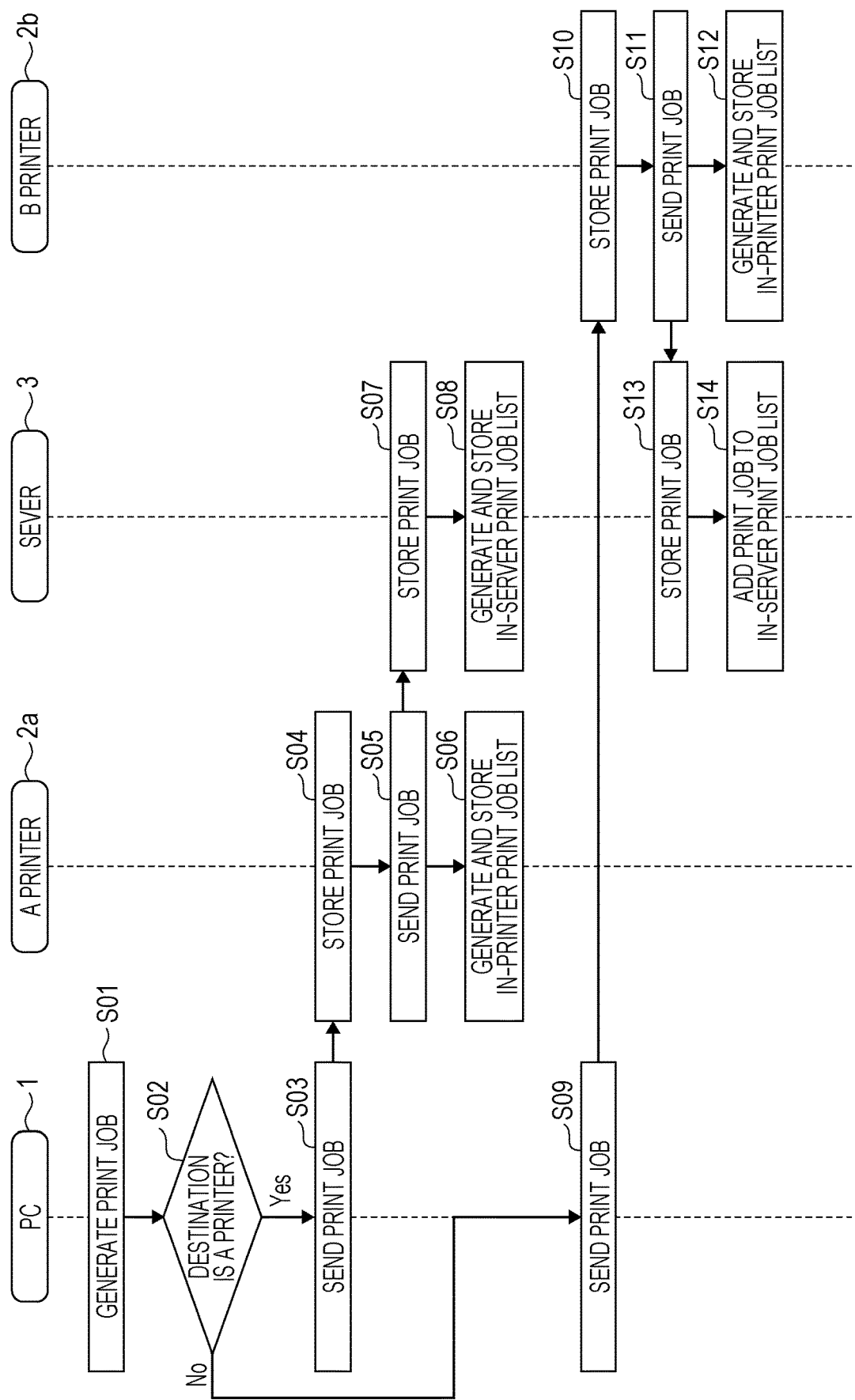
FIG. 9 is a flowchart illustrating a flow of print job storing processing.

FIG. 9 is a flowchart illustrating a flow of print job storing processing. The print job storing processing and authenticated printing processing described later are an example of the "method for controlling the printing system". In the description about these kinds of processing, it is assumed that a print job is designated on the B printer 2b. In this case, the B printer 2b is an example of a "designated printing apparatus. When a print job is sent by the PC 1 to the A printer 2a, the A printer 2a is an example of a "target printing apparatus"; when a print job is sent by the PC 1 to the B printer 2b, the B printer 2b is an example of the "target printing apparatus".

The PC 1 generates a print job (S01) and determines whether the A printer 2a is designated as the destination of the print job (S02). When the A printer 2a is designated as the destination of the print job (Yes in S02), the PC 1 sends the generated print job to the A printer 2a (S03). At this time, identification information for identifying a particular user who generated the print job is added to the print job. The A printer 2a stores in itself the print job received from the PC 1 (S04) and sends the print job to the server 3 (S05). In addition, the A printer 2a generates the in-printer print job list L1 in accordance with the stored print job and stores the in-printer print job list L1 in the A printer 2a per se (S06). After the A printer 2a generates the in-printer print job list L1, when the A printer 2a receives a print job from the PC 1, the A printer 2a adds the received print job to the in-printer print job list L1. The server 3 stores in itself the print job received from the A printer 2a (S07), and generates the in-server print job list L2 in accordance with the stored print job and stores in itself the in-server print job list L2 (S08).

When the A printer 2a is not designated as the destination of the print job, in other words, when the B printer 2b is designated as the destination of the print job (No in S02), the PC 1 sends the generated print job to the B printer 2b (S09).

The B printer 2b stores in itself the print job received from the PC 1 (S10) and sends the print job to the server 3 (S11). In addition, the B printer 2b generates the in-printer print job list L1 in accordance with the stored print job and stores the in-printer print job list L1 in the B printer 2b per se (S12). After the B printer 2b generates the in-printer print job list L1, when the B printer 2b receives a print job from the PC 1, the B printer 2b adds the received print job to the in-printer print job list L1. The server 3 stores in itself the print job received from the B printer 2b (S13) and adds the stored print job to the in-server print job list L2 (S14).

Figure 10:
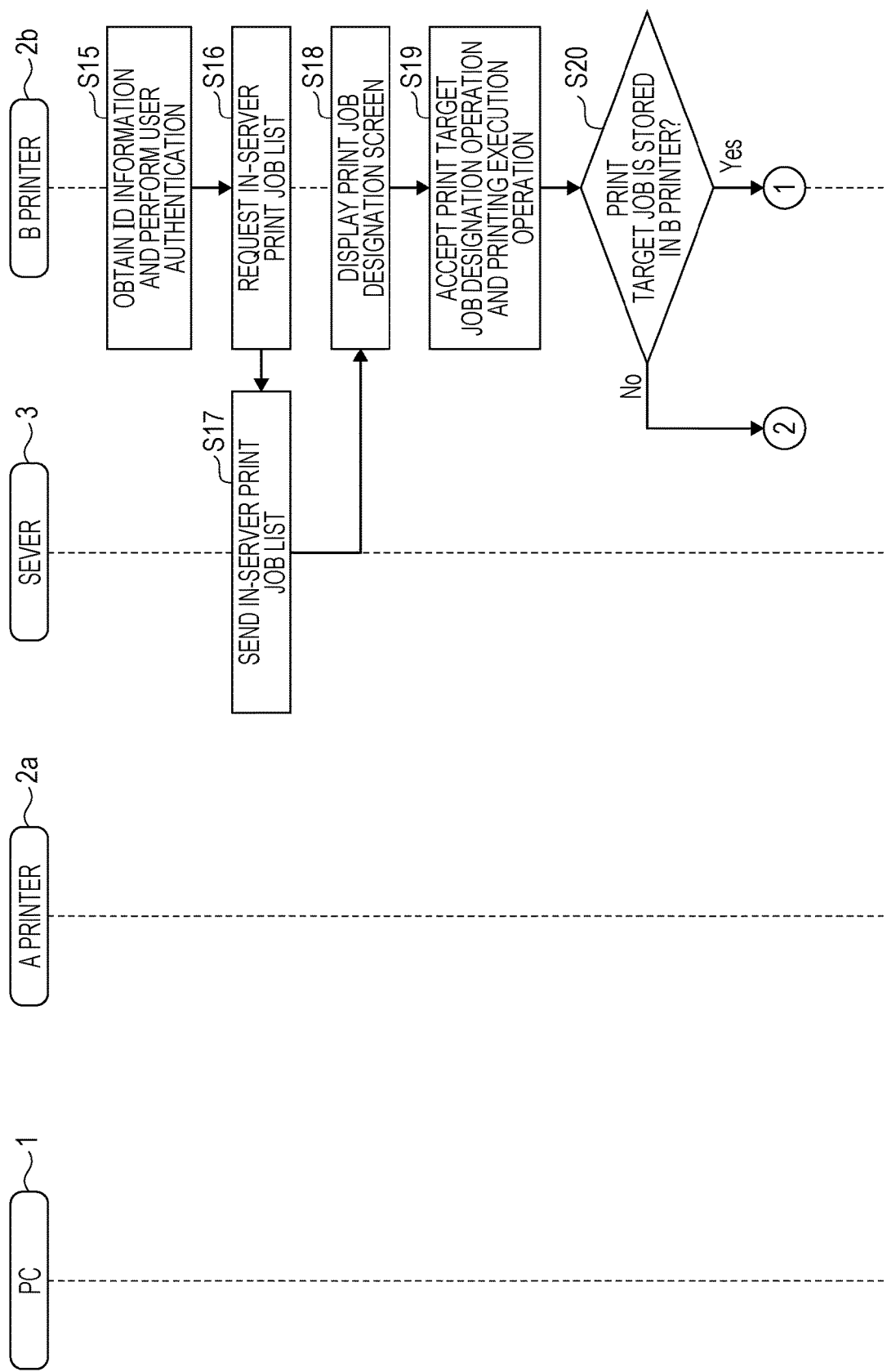
FIG. 10 is a flowchart illustrating a flow of authenticated printing processing.
Figure 11:
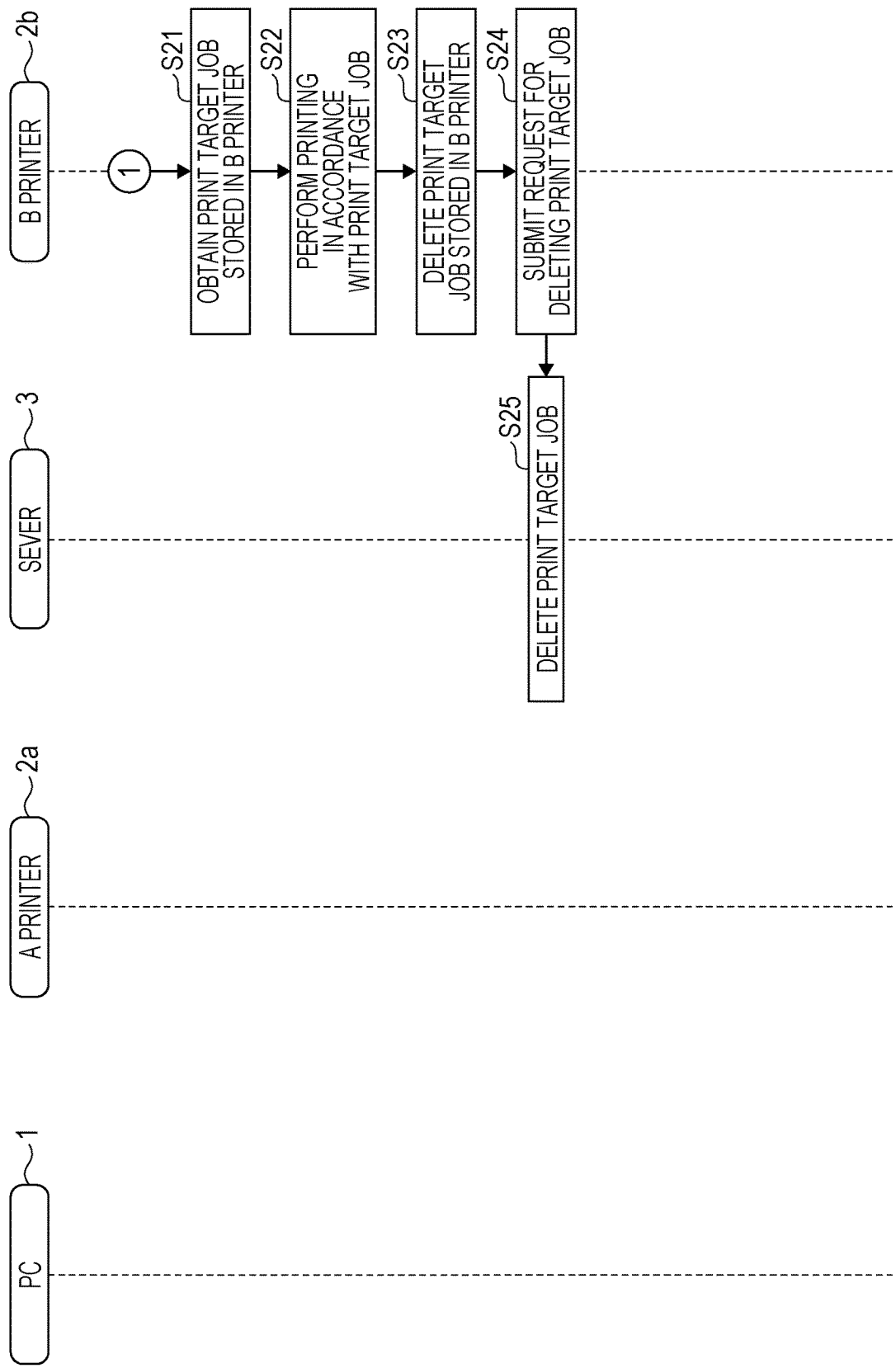
FIG. 11 is another flowchart illustrating the flow of authenticated printing processing as a continuation of the flow in FIG. 10.
Figure 12:
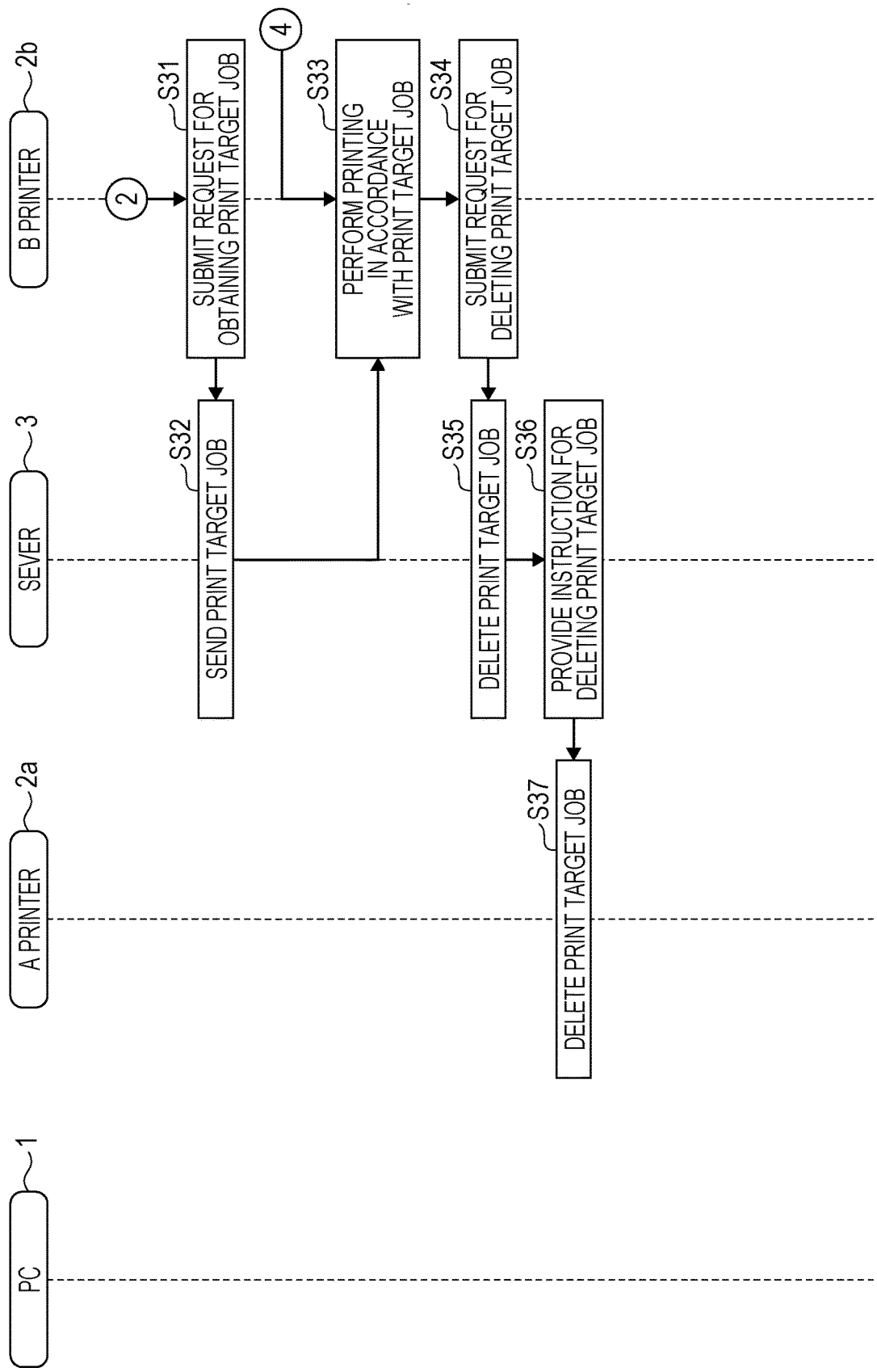
FIG. 12 is another flowchart illustrating the flow of authenticated printing processing as a continuation of the flow in FIG. 10.

FIGS. 10 to 12 are flowcharts illustrating a flow of authenticated printing processing. The B printer 2b obtains ID information by reading an ID card with use of the card reader 22 and performs user authentication by referring to the in-printer user list 46 (S15). When the user authentication succeeds, the B printer 2b requests the in-server print job list L2 from the server 3 (S16). In response to this, the server 3 sends the in-server print job list L2 to the B printer 2b (S17). At this time, the server 3 may send to the B printer 2b information obtained by excluding the printer identification information from the fields of the in-server print job list L2.

When the B printer 2b receives the in-server print job list L2 from the server 3, the B printer 2b displays the print job designation screen 50 (refer to FIGS. 7 and 8) on the basis of the received in-server print job list L2 and the in-printer print job list L1 stored in the B printer 2b per se (S18). At this time, the B printer 2b displays the designation list for a printer L3 by extracting print jobs corresponding to the user ID of a particular authenticated user from the in-printer print job list L1. The B printer 2b displays the designation list for a server L4 by extracting print jobs corresponding to the user ID of a particular authenticated user from the in-server print job list L2 and also deleting print jobs included in the designation list for a printer L3. When the B printer 2b cannot obtain the in-server print job list L2 from the server 3, the B printer 2b displays only the designation list for a printer L3 on the print job designation screen 50.

The B printer 2b accepts an operation for designating a print job and an operation for executing printing that are performed by the user on the print job designation screen 50 (S19). The print job designation operation is performed by selecting a selection box on the print job designation screen 50 and the printing execution operation is performed by selecting the first print button 53. The print job designated by the user in the designation list for a printer L3 or the designation list for a server L4 displayed on the print job designation screen 50 is hereinafter referred to as a "print target job". The B printer 2b determines whether the print target job is stored in the B printer 2b per se, in other words, whether the print target job is designated in the designation list for a printer L3 or the designation list for a server L4 (S20).

When the B printer 2b determines that the print target job is stored in the B printer 2b per se (Yes in S20), the B printer 2b obtains the print target job from the in-printer database D1 in the B printer 2b per se (S21) as illustrated in FIG. 11. The B printer 2b then performs printing in accordance with the obtained print target job (S22) and deletes the print target job stored in the in-printer database D1 in the B printer 2b (S23). In addition, the B printer 2b submits to the server 3 a request for deleting the print target job stored in the in-server database D2 (S24). In response to this, the server 3 deletes the print target job in the in-server database D2 (S25).

By contrast, when the B printer 2b determines that the print target job is not stored in the B printer 2b per se (No in S20), the B printer 2b submits to the server 3 a request for obtaining the print target job (S31) as illustrated in FIG. 12. In response to this, the server 3 sends to the B printer 2b the print target job that is read from the in-server database D2 (S32). The B printer 2b prints in accordance with the print target job received from the server 3 (S33) and submits to the server 3 a request for deleting the print target job in the other printer 2 storing the print target job, that is, the A printer 2a (S34). In accordance with the request for deleting the print target job, the server 3 deletes the print target job in the in-server database D2 (S35) and provides the A printer 2a with an instruction for deleting the print target job (S36). At this time, the server 3 obtains, from the B printer 2b, information for identifying the print target job such as the job-related information, identifies the print job with regard to which the server 3 is to provide the instruction for deletion, and, by referring to the in-server print job list L2, identifies the printer 2 in which the print target job is stored. When the A printer 2a receives from the server 3 the instruction for deleting the print target job, the A printer 2a deletes the print target job stored in the in-printer database D1 in the A printer 2a per se (S37).

As described above, according to the first embodiment, when the PC 1 sends a print job to the B printer 2b, the print job is stored in both the B printer 2b and the server 3, and thus, the B printer 2b can print in accordance with a designated print target job when the server 3 is unusable. Furthermore, in the case in which a print target job is stored in not the B printer 2b but the A printer 2a, the B printer 2b can obtain the print target job from the server 3, and thus, the B printer 2b can print in accordance with the print target job when the A printer 2a is unusable.

Further, when the designated print target job is not stored in the B printer 2b and the B printer 2b obtains the print target job from the server 3, the B printer 2b submits a request for deleting the print target job stored in the A printer 2a, and thus, it is possible to avoid the state in which a print job that is no longer necessary remains in the A printer 2a.

Moreover, the PC 1 sends a print job to any of the plurality of the printers 2 in the printing system SY as the destination, and thus, while employing a method of using a serverless authenticated printing system in which authenticated printing is implemented by only the printer 2, it is possible to gain the merit of a server authenticated printing system in which authenticated printing is implemented by using the server 3. The merit of the server authenticated printing system is that any printer 2 can print when the printer 2 is under the control of the server 3. The merit of the serverless authenticated printing system is that, because the server 3 is unnecessary, in the state in which the server 3 is unusable, it is possible to print with use of the printer 2 on which an authentication operation is performed. In this embodiment, it is possible to gain the merits of both systems.

Furthermore, the designation list for a printer L3 and the designation list for a server L4 are displayed while separated into tabs on the print job designation screen 50 on which a print target job is designated, and as a result, the user can check whether the designated print target job is stored in the B printer 2b. With this configuration, when the user designates a print target job in, for example, the designation list for a server L4, the user can realize a possibility that the print result would be affected by the difference in properties between the A printer 2a that sends the print job and the B printer 2b.

The first embodiment may be applied as the following modified examples.

Modified Example 1-1

While the PC 1 sends a print job to any of the plurality of the printers 2 as the destination in the printing system SY, the print job may be sent to the server 3 as the destination instead of the printer 2. This means that the print job may be sent by employing the method of transmission using the server authenticated printing system. In this case, the server 3 stores in itself the print job received from the PC 1 and also sends the print job to any of the plurality of the printers 2 in the printing system SY. The printer 2 to which the server 3 sends the print job may be a fixed printer 2 or a printer 2 designated by the PC 1. In the latter case, the PC 1 adds, to the print job, information for designating the printer 2 in which the print job is to be stored and sends the print job and the information to the server 3.

Modified Example 1-2

The PC 1 may send a print job directly to both the server 3 and any of the plurality of the printers 2 in the printing system SY.

Modified Example 1-3

A print job may be stored in two or more of the plurality of the printers 2 in the printing system SY.

Modified Example 1-4

While in the embodiment described above user authentication is performed on the printer 2, user authentication may be not performed. In this case, the printer 2 does not obtain the ID information and submits a request for the in-server print job list L2 to the server 3 in response to a user's operation for displaying the print job designation list. The printer 2 then obtains the in-server print job list L2 from the server 3 and displays the print job designation screen 50 in accordance with the obtained in-server print job list L2. On the print job designation screen 50, the print job designation list on which a print job can be designated in the obtained in-server print job list L2 is displayed. At this time, the printer 2 may display a list in which a print job included in the in-printer print job list L1 stored in the printer 2 per se is designated and a list in which a print job not included in the in-printer print job list L1 stored in the printer 2 per se is designated in a manner in which the lists are separated into tabs.

Modified Example 1-5

While in the embodiment described above the designation list for a printer L3 and the designation list for a server L4 are displayed while separated into tabs on the print job designation screen 50, other methods may be applied when the methods enable checking whether a particular print job is included in the in-printer print job list L1 of a target printer. For example, the printer 2 may display a print job designation list in which a particular print job in the in-server print job list L2 can be designated. In the print job designation list, a print job included or not included in the in-printer print job list L1 of the printer 2 per se may be displayed with a predetermined adornment.

Alternatively, the print job designation list may be presented to the user in a manner other than displaying the print job designation list in the printer display unit 24. For example, it is considered to use a manner such as providing audio guidance regarding print jobs in the print job designation list or sending the print job designation list to a smartphone possessed by the user.

Modified Example 1-6

While in the embodiment described above, after receiving a print job, the printer 2 generates the in-printer print job list L1 and stores the in-printer print job list L1 in itself, the generation and the storing of the in-printer print job list L1 may be omitted. In this case, the printer 2 can determine, in accordance with the printer identification information included in the in-server print job list L2 obtained from the server 3, whether a particular print job is to be included in the designation list for a printer L3 or the designation list for a server L4.

Second Embodiment

Next, a second embodiment is described. The second embodiment is characterized in that information for identifying the printer 2 storing the print target job is presented to the user when the print target job is not stored in the printer 2 on which the print target job is designated and the server 3 is unusable. Hereinafter, description is made while focusing on points different from the first embodiment. In this embodiment, constituent elements identical to those of the first embodiment are assigned the same reference characters and detailed description thereof is omitted. The modified examples applied to the constituent elements identical to those of the first embodiment are also applied to this embodiment.

In this embodiment, the system configuration and the hardware configuration of the PC 1, the printer 2, and the server 3 are substantially the same as those of the first embodiment. However, in this embodiment, the printer storage unit 27 stores a first print job list and a second print job list described later instead of the in-printer print job list L1.

Figure 13:
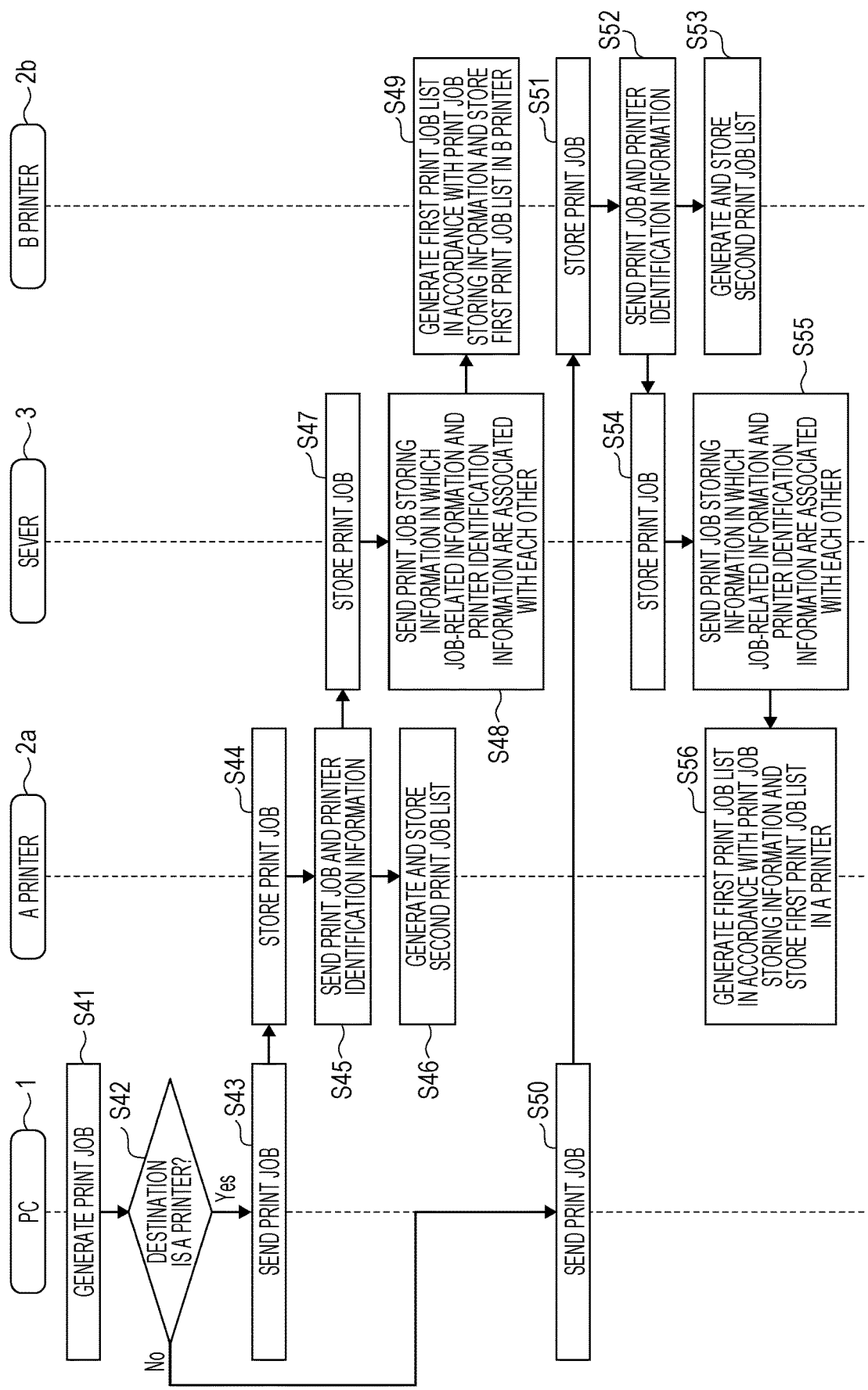
FIG. 13 is a flowchart illustrating a flow of print job storing processing according to a second embodiment.

FIG. 13 is a flowchart illustrating a flow of print job storing processing according to the second embodiment. The print job storing processing and authenticated printing processing described later are an example of the "method for controlling the printing system". In the description about these kinds of processing, it is assumed that a print job is designated on the B printer 2b. In this case, the B printer 2b is an example of a "designated printing apparatus. When a print job is sent by the PC 1 to the A printer 2a, the A printer 2a is an example of a "target printing apparatus"; when a print job is sent by the PC 1 to the B printer 2b, the B printer 2b is an example of the "target printing apparatus".

The PC 1 generates a print job (S41) and determines whether the A printer 2a is designated as the destination of the print job (S42). When the A printer 2a is designated (Yes in S42), the PC 1 sends the generated print job to the A printer 2a (S43). The A printer 2a stores in itself the print job received from the PC 1 (S44). The A printer 2a also sends the print job received from the PC 1 and printer identification information for identifying the A printer 2a to the server 3 (S45). The printer identification information is an example of "information for identifying the target printing apparatus". In addition, the A printer 2a generates the second print job list in accordance with the stored print job and stores the second print job list in the A printer 2a per se (S46). Here, the second print job list is a list in which job-related information is recorded for each print job. After the A printer 2a generates the second print job list, when the A printer 2a receives a print job from the PC 1, the A printer 2a adds the received print job to the second print job list.

The server 3 stores in itself the print job received from the A printer 2a (S47). The server 3 also sends print job storing information to the printer 2 other than the A printer 2a in the printing system SY, that is, the B printer 2b (S48). In the print job storing information, the job-related information and the printer identification information of the print job received from the A printer 2a are associated with each other. The B printer 2b generates the first print job list in accordance with the print job storing information received from the server 3 and stores the first print job list in the B printer 2b per se (S49).

Here, the first print job list stored in the B printer 2b is a list in which job-related information and printer identification information indicating the printer 2 storing a particular print job are recorded for each print job. When the server 3 stores the in-server print job list L2 (refer to FIG. 6) according to the first embodiment, the first print job list corresponds to the in-server print job list L2 excluding print jobs associated with printer identification information indicating "B". After the B printer 2b generates the first print job list, when the B printer 2b receives the print job storing information from the server 3, the B printer 2b adds the received print job storing information to the first print job list.

When the A printer 2a is not designated as the destination of the print job, in other words, when the B printer 2b is designated as the destination of the print job (No in S42), the PC 1 sends the generated print job to the B printer 2b (S50). The B printer 2b stores in itself the print job received from the PC 1 (S51). The B printer 2b also sends the print job received from the PC 1 and printer identification information for identifying the B printer 2b to the server 3 (S52). In addition, the B printer 2b generates the second print job list in accordance with the stored print job and stores the second print job list in the B printer 2b per se (S53). The second print job list generated by the B printer 2b corresponds to the in-printer print job list L1 of the first embodiment (refer to FIG. 5). After the B printer 2b generates the second print job list, when the B printer 2b receives a print job from the PC 1, the B printer 2b adds the received print job to the second print job list.

The server 3 stores in itself the print job received from the B printer 2b (S54). The server 3 also sends the print job storing information to the printer 2 other than the B printer 2b in the printing system SY, that is, the A printer 2a (S55). In the print job storing information, the job-related information and the printer identification information of the print job received from the B printer 2b are associated with each other. The A printer 2a generates the first print job list in accordance with the print job storing information received from the server 3 and stores the first print job list in the A printer 2a per se (S56).

Figure 14:
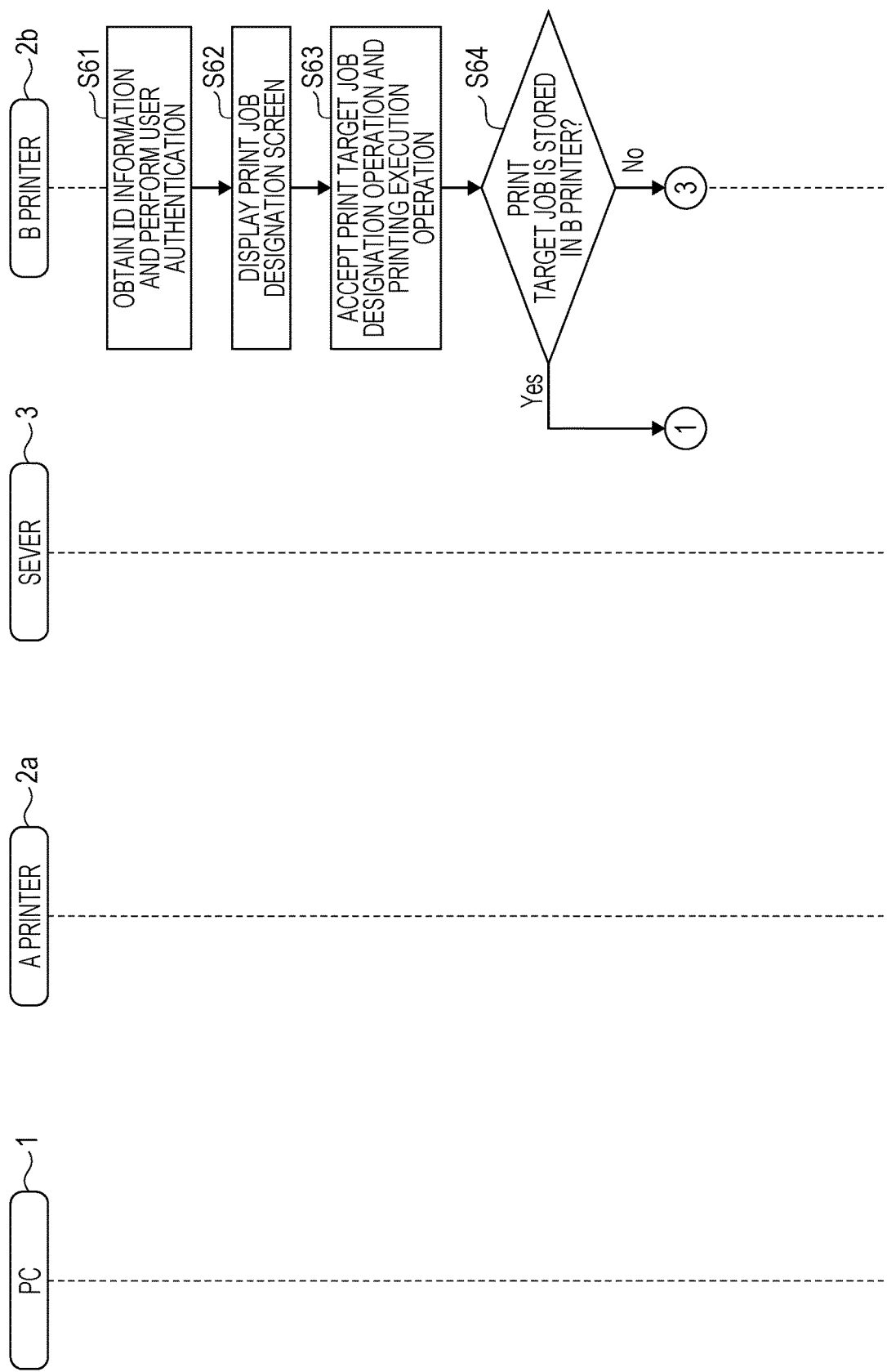
FIG. 14 is a flowchart illustrating a flow of authenticated printing processing according to the second embodiment.
Figure 15:
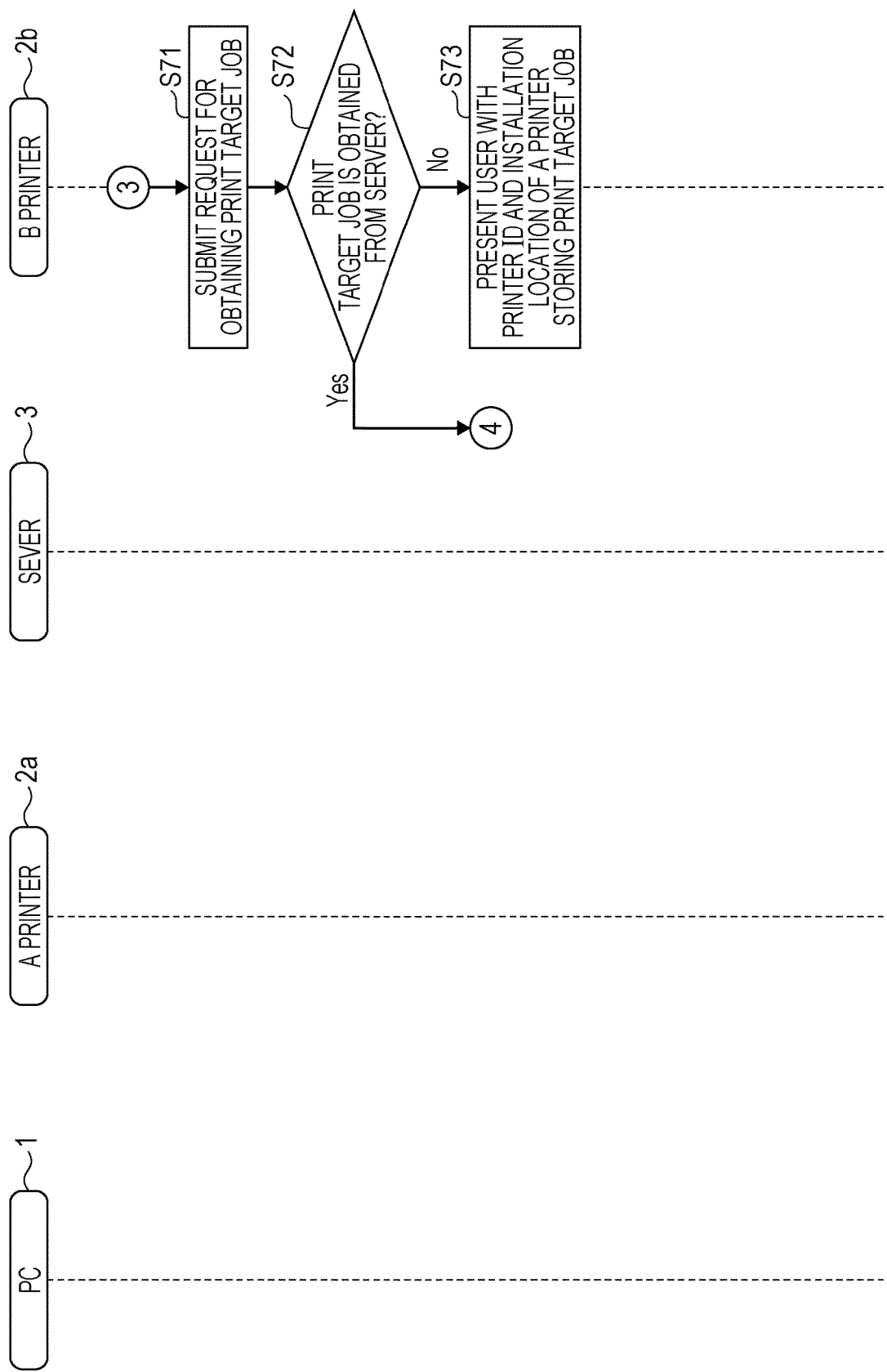
FIG. 15 is another flowchart illustrating the flow of authenticated printing processing as a continuation of the flow in FIG. 14.

FIGS. 14 to 15 are flowcharts illustrating a flow of authenticated printing processing according to the second embodiment. The B printer 2b obtains ID information by reading an ID card with use of the card reader 22 and performs user authentication (S61). When the user authentication succeeds, the B printer 2b displays a print job designation screen 60 (S62).

Figure 16:
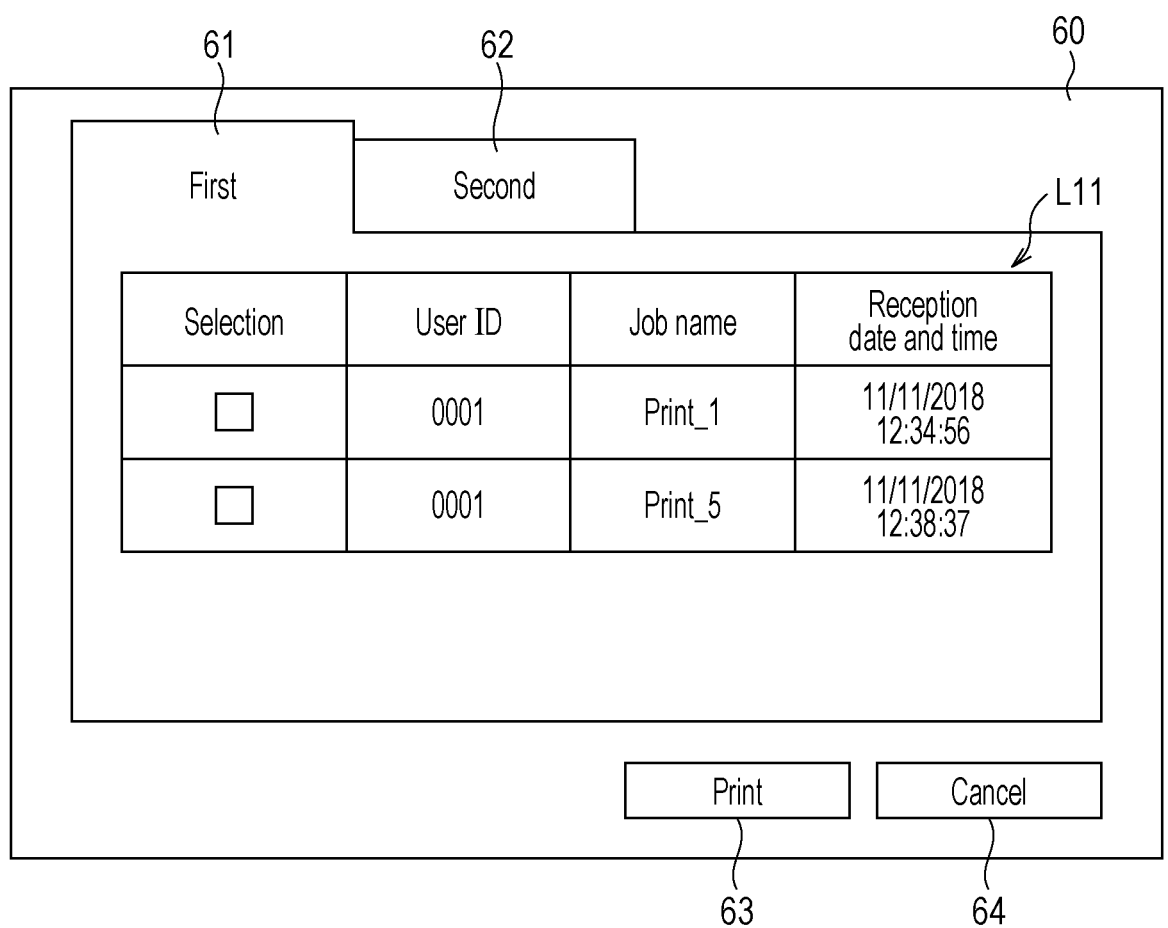
FIG. 16 illustrates an example of a print job designation screen according to the second embodiment.
Figure 17:
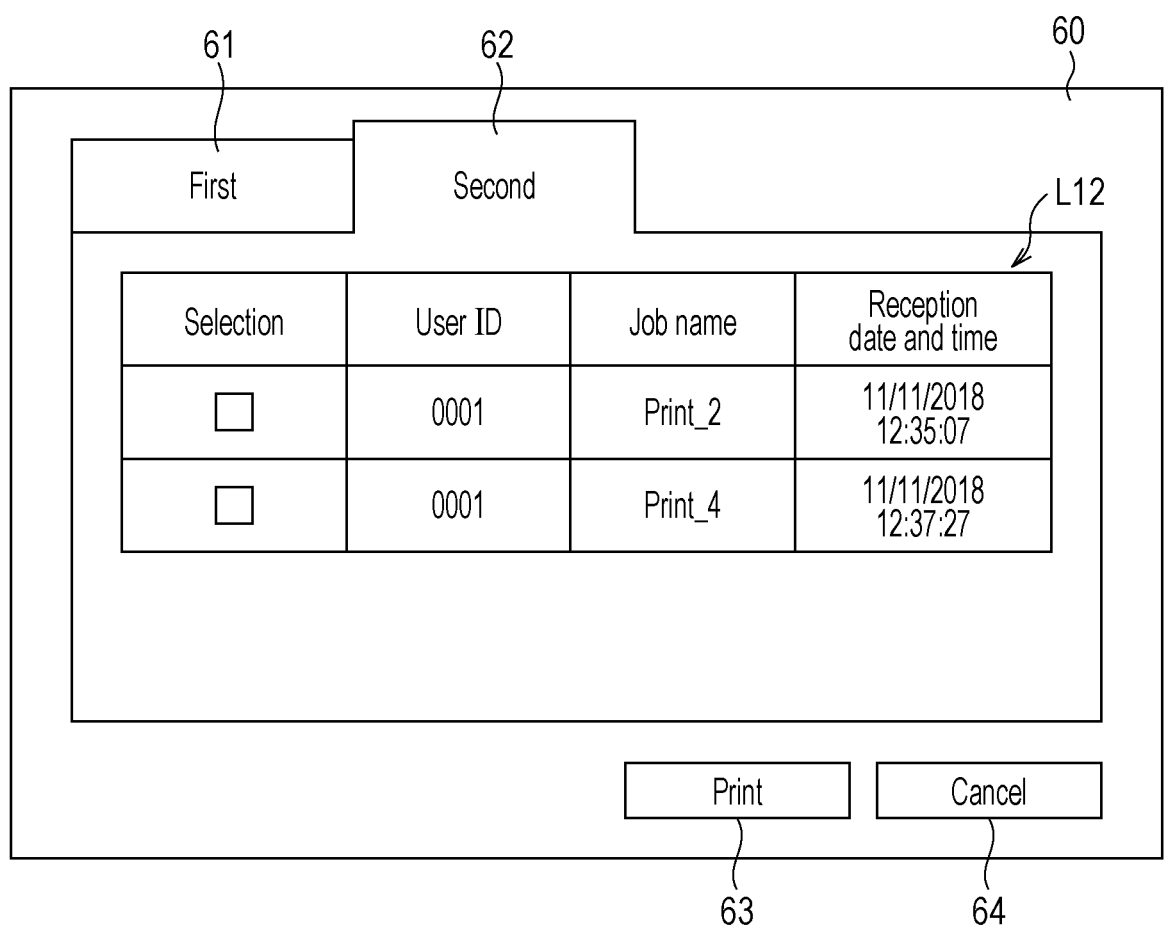
FIG. 17 illustrates another example of the print job designation screen according to the second embodiment.

FIGS. 16 and 17 illustrate examples of the print job designation screen 60. FIGS. 16 and 17 depict examples of display when the user of the user ID "0001" has accomplished authentication on the B printer 2*b*. The print job designation screen 60 according to this embodiment displays a first print job designation list L11, which is displayed by selecting a first tab 61, or a second print job designation list L12, which is displayed by selecting a second tab 62, and a second printing button 63 and a second cancel button 64. The second printing button 63 and the second cancel button 64 function in a manner identical to that of the first print button 53 and the first cancel button 54 according to the first embodiment. The first print job designation list L11 is a list formed by extracting print jobs assigned the user ID "0001" from print jobs included in the first print job list. The second print job designation list L12 is a list formed by extracting print jobs assigned the user ID "0001" from print jobs included in the second print job list.

Moving back to the description of FIG. 14, the B printer 2*b* displays the print job designation screen 50 and then accepts an operation for designating a print target job and an operation for executing printing that are performed by the user on the print job designation screen 50 (S63). Afterwards, the B printer 2*b* determines whether the print target job is stored in the B printer 2*b* per se, in other words, whether the print target job is designated in the second print job designation list L12 or the first print job designation list L11 (S64). When the B printer 2*b* determines that the print target job is stored in the B printer 2*b* per se (Yes in S64), the B printer 2*b* proceeds to S21 in FIG. 11.

By contrast, when the B printer 2*b* determines that the print target job is not stored in the B printer 2*b* per se (No in S64), the B printer 2*b* submits to the server 3 a request for obtaining the print target job (S71) as illustrated in FIG. 15. The B printer 2*b* determines whether the print target job has been obtained from the server 3 (S72). When the B printer 2*b* determines that the print target job has been obtained from the server 3 (Yes in S72), the B printer 2*b* proceeds to S33 in FIG. 12. When the B printer 2*b* determines that the print target job has not been obtained from the server 3 (No in S72), the B printer 2*b* presents to the user the printer ID and the installation location of the A printer 2*a* storing the print target job in accordance with the first print job list stored in the B printer 2*b* per se (S73). Here, the printer ID and the installation location of the A printer 2*a* are an example of "information for specifying a printing apparatus storing a print target job".

Figure 18:
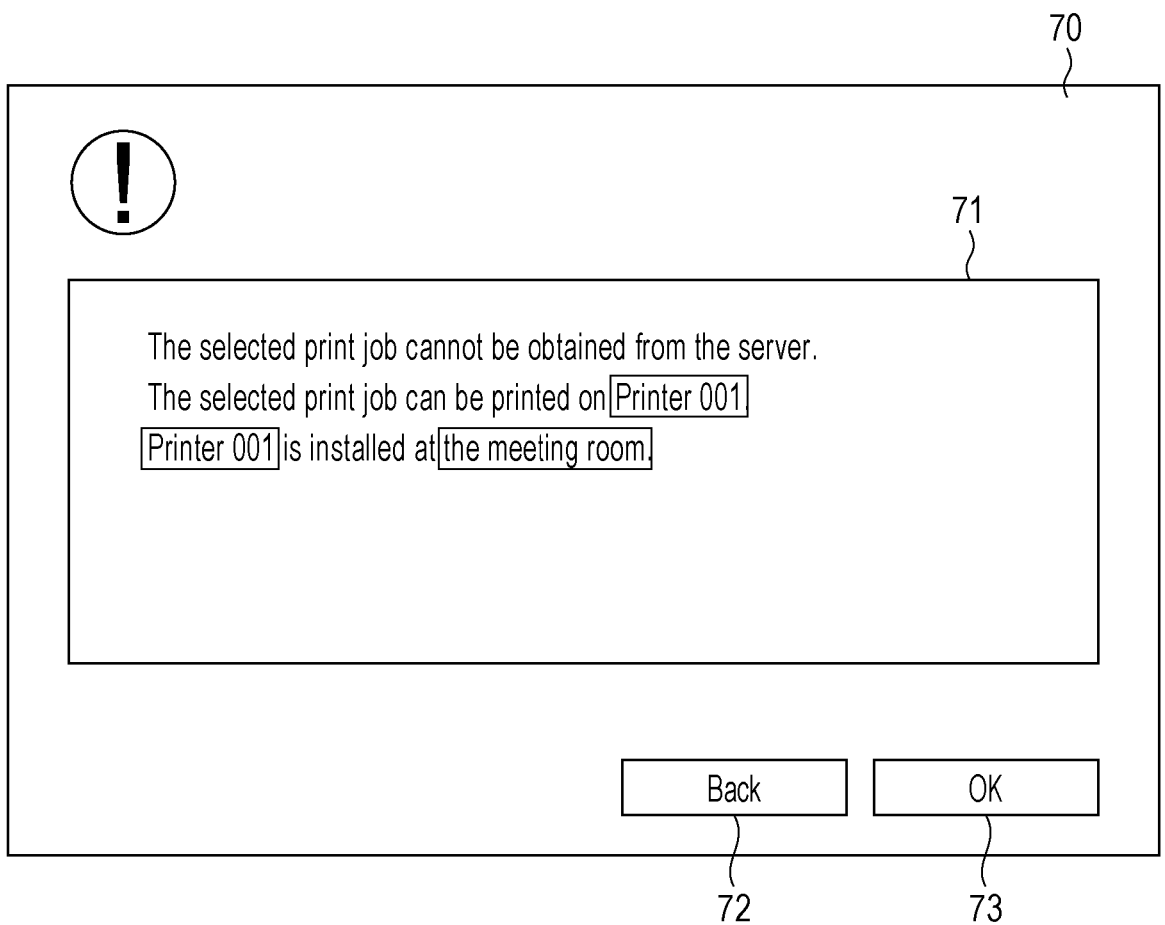
FIG. 18 illustrates an example of an information provision screen according to the second embodiment.

FIG. 18 illustrates an example of an information provision screen 70 according to the second embodiment. The information provision screen 70 displays a message 71 that is provided for the user, a back button 72, and an OK button 73. The message 71 contains a text indicating that the print target job has not been obtained from the server 3, and the printer ID and the installation location of the printer 2 storing the print target job. As the installation location, instead of or in addition to the text, an illustration and/or a symbol may be displayed.

When the user selects the back button 72, the printer control unit 21 displays the print job designation screen 60 for designating a print job. When the user selects the OK button 73, the printer control unit 21 displays an initial screen not illustrated in the drawing.

As described above, according to the second embodiment, information for identifying the printer 2 storing the print target job can be presented to the user when the print target job is not stored in the printer 2 on which the print target job is designated and the server 3 is unusable. This configuration enables the user to recognize the printer 2 storing the print target job and print by using the printer 2.

Furthermore, since the printer 2 on which a print target job is designated presents to the user the first print job designation list L11 and the second print job designation list L12 on the print job designation screen 60, the user can check whether the print target job is not stored in the printer 2 on which the operation for designation is performed in accordance with whether the designated print target job is included in a particular list. For example, when the first print job designation list L11 includes the print target job, this configuration enables the user to realize a possibility that the print result would be affected by the difference in properties between the A printer 2*a* that sends the print job and the B printer 2*b*.

The second embodiment may be applied as the following modified examples.

Modified Example 2-1

While in the second embodiment the printer 2 receives a print job from the PC 1 and then sends the print job and printer identification information to the server 3 (refer to S45 in FIG. 13), the printer 2 may send only the print job. In this case, the server 3 can store in itself the printer table in which the IP address and the printer identification information of the printer 2 are associated with each other and obtain the printer identification information in accordance with the IP address of the printer 2 that is the source of a print job.

Modified Example 2-2

Similarly to the modified example 1-4, user authentication may be not performed in the second embodiment. In this case, the printer 2 displays on the print job designation screen 60 the print job designation list, in which a particular print job can be designated among print jobs included in the first print job list and print jobs included in the second print job list, in response to an operation for displaying the print job designation list performed by the user.

The first and second embodiments may be applied as the following modified examples.

Modified Example 3-1

While in the embodiments described above the printer 2 performs user authentication in accordance with the in-printer user list 46, the server 3 may perform user authentication. In this case, when the printer 2 requests the in-server print job list L2 from the server 3, the printer 2 sends to the server 3 the ID information that is read from an ID card. The server 3 refers to a user list for server authentication in which a user ID and ID information are associated with each other and performs user authentication in accordance with the obtained ID information. The server 3 determines that user authentication succeeds when the user list for server authentication includes the obtained ID information; when the server 3 determines that user authentication succeeds, the server 3 sends the in-server print job list L2 to the printer 2.

Modified Example 3-2

The method of performing processing operations of the PC 1, the printer 2, and the server 3 described in the embodiments and the modified examples, the program for performing the processing operations of the PC 1, the printer 2, and the server 3, and a computer-readable storage medium storing the program for performing the processing operations are also embodied in the scope of the present disclosure. Moreover, the embodiment and the modified examples may be combined with each other.

Modified Example 3-3

Instead of the PC 1, various kinds of information processing terminals, such as various tablet terminals and smartphones, may be used. In addition, the method for implementing the processing operations of the PC 1, the printer 2, and the server 3 may be changed as appropriate to any manner, such as a method implemented by using hardware and software cooperating with each other, without departing from the spirit and scope of the present disclosure.

APPENDIXES

Hereinafter, appendixes regarding the printing system, the printing apparatus, the method for controlling the printing system, and the program are provided.

The printing system SY includes a PC 1 that generates a print job, a server 3, and a plurality of printers 2. The print job generated by the PC 1 is stored in any of the plurality of the printers 2 and the server 3. When a print target job targeted for printing is designated on a designated printer 2 of the plurality of the printers among one or more print jobs stored in the server 3 and the printer 2, in the case in which the print target job is stored in the designated printer 2 per se, the designated printer 2 prints in accordance with the print target job, and in the case in which the print target job is not stored in the designated printer 2 per se, the designated printer 2 obtains from the server 3 the print target job stored in the server 3 and prints in accordance with the obtained print target job.

The printer 2 includes the printer control unit 21 and the printer engine 25. When the printer control unit 21 receives a print job from the PC 1, the printer control unit 21 stores in the printer 2 the received print job and sends the received print job to the server 3 to cause the server 3 to store the print job. When a print target job targeted for printing is designated among print jobs, in the case in which the print target job is stored in the printer 2 per se, the printer control unit 21 causes the printer engine 25 to print in accordance with the print target job stored in the printer 2, and in the case in which the print target job is not stored in the printer 2 per se, the printer control unit 21 obtains from the server 3 the print target job stored in the server 3 and causes the printer engine 25 to print in accordance with the obtained print target job.

In the method for controlling the printing system SY, the printing system SY includes the PC 1 that generates a print job, the server 3, and the plurality of printers 2. The print job generated by the PC 1 is stored in any of the plurality of the printers 2 and the server 3. When a print target job targeted for printing is designated on the designated printer 2 of the plurality of the printers among one or more print jobs stored in the server 3 and the printer 2, in the case in which the print target job is stored in the designated printer 2 per se, the designated printer 2 prints in accordance with the print target job, and in the case in which the print target job is not stored in the designated printer 2 per se, the designated printer 2 obtains from the server 3 the print target job stored in the server 3 and prints in accordance with the obtained print target job.

The program causes the printer control unit 21 of the printer 2 including the printer control unit 21 and the printer engine 25 to, when receives a print job from the PC 1, store in the printer 2 the received print job and send the received print job to the server 3 to cause the server 3 to store the print job. When a print target job targeted for printing is designated among print jobs stored in the server 3 and the printer 2, in the case in which the print target job is stored in the printer 2 per se, the program causes the printer control unit 21 to control the printer engine 25 to print in accordance with the print target job stored in the printer 2, and in the case in which the print target job is not stored in the printer 2 per se, the program causes the printer control unit 21 to obtain from the server 3 the print target job stored in the server 3 and control the printer engine 25 to print in accordance with the obtained print target job.

With this configuration, since the print job generated by the PC 1 is stored in any of the plurality of the printers 2 and the server 3, in the case in which the server 3 is unusable, when the print target job is stored in the designated printer 2 on which the print target job is designated, printing can be performed in accordance with the print target job. When the print target job is not stored in the designated printer 2, the print target job can be obtained from the server 3, and thus, printing can be performed in accordance with the obtained print target job in the case in which the printer 2 storing the print target job is unusable.

In the printing system SY, when the print target job is not stored in the designated printer 2, the designated printer 2 may submit to the server 3 a request for deletion of the print target job stored in another printer 2. When the server 3 receives the request for deletion of the print target job, the server 3 may provide an instruction for deletion of the print target job for the printer 2 storing the print target job.

With this configuration, when the designated printer 2 obtains the print target job from the server 3, the print target job that is considered no longer necessary can be deleted in the printer 2 storing the print target job.

In the printing system SY, the PC 1 may send a print job to the target printer 2 that is any of the plurality of printers 2. The target printer 2 may store in itself the print job received from the PC 1 and send the print job to the server 3. The server 3 may store in itself the print job received from the target printer 2.

With this configuration, while employing a method of using a serverless printing system in which the PC 1 sends a print job to any of the plurality of printers 2, it is possible to gain the merit of a server printing system.

In the printing system SY, the server 3 may generate the in-server print job list L2 that is a list of print jobs obtained from the target printer 2 and store in itself the in-server print job list L2. The printer 2 serving as the designated printer 2 may obtain the in-server print job list L2 from the server 3, generate the print job designation list for designating a print target job in accordance with the obtained in-server print job list L2, and present the generated print job designation list to the user.

With this configuration, the printer 2 serving as the designated printer 2 can generate the print job designation list for designating a print target job in accordance with the in-server print job list L2 obtained from the server 3.

In the printing system SY, the printer 2 serving as the designated printer 2 may present to the user the print job designation list in a manner in which the print job stored in the printer 2 and the print job not stored in the printer 2 are distinguished from each other.

With this configuration, the user who designates a print target job can check whether the designated print target job is stored in the printer 2 serving as the designated printer 2. With this configuration, for example, when the print target job is not stored in the printer 2 serving as the designated printer 2, the user can realize a possibility that the print result would be affected by the difference in properties between the target printer 2 that sends the print job and the designated printer 2.

In the printing system SY, identification information for identifying a particular user may be attached to the print job. The printer 2 serving as the designated printer 2 may perform user authentication in accordance with information obtained from a user. When the user authentication succeeds, the printer 2 serving as the designated printer 2 may present to the user the print job designation list for a user as the print job designation list. The print job designation list for a user may be formed by extracting from the in-server print job list L2 the print job to which the identification information corresponding to the authenticated user is attached.

With this configuration, the printing system SY can be applied as an authenticated printing system.

In the printing system SY, the server 3 may send, to the printer 2 other than the target printer 2 among the plurality of the printers 2, the print job storing information in which the job-related information of a print job obtained from the target printer 2 and the information for identifying the target printer 2 are associated with each other. The printer 2 having received the print job storing information may generate the first print job list in accordance with the obtained print job storing information and record the first print job list in the printer 2 per se. When the print target job is not stored in the designated printer 2 and the print target job is not obtained from the server 3, the designated printer 2 may present to a user, in accordance with the first print job list, information for specifying the printer 2 storing the print target job.

With this configuration, the information for identifying the printer 2 storing the print target job can be presented to the user when the print target job is not stored in the printer 2 on which the print target job is designated and the server 3 is unusable. This configuration enables the user to recognize the printer 2 storing the print target job and print by using the printer 2.

In the printing system SY, the printer 2 serving as the designated printer 2 may present to the user, as the print job designation list for designating the print target job, the first print job designation list L11 based on the first print job list and the second print job designation list L12 of the print job stored in the printing apparatus serving as the designated printing apparatus per se.

With this configuration, the user who designates a print target job can check, in accordance with whether the designated print target job is included in the first print job designation list L11 or the second print job designation list L12, whether the designated print target job is stored in the printer 2 serving as the designated printer 2. For example, when the first print job designation list L11 includes the print target job, this configuration enables the user to realize a possibility that the print result would be affected by the difference in properties between the target printer 2 that sends the print job and the designated printer 2.

What is claimed is:

1. A printing system comprising:
   a print control apparatus that generates a print job;
   a print server; and
   a plurality of printing apparatuses, wherein
   the print job generated by the print control apparatus is stored in a printing apparatus of the plurality of printing apparatuses and the print server,
   on a designated printing apparatus that is a printing apparatus of the plurality of printing apparatuses, a print target job targeted for printing is designated among one or more print jobs stored in the print server and the printing apparatus storing the print job, the one or more print jobs each being the print job,
   when the print target job is stored in a designated first printing apparatus of the plurality of printing apparatuses, the designated first printing apparatus prints in accordance with the print target job,
   when the print target job is not stored in the designated first printing apparatus of the plurality of printing apparatuses, the designated first printing apparatus obtains from the print server the print target job stored in the print server and prints in accordance with the obtained print target job,
   when the print target job is not stored in a designated second printing apparatus of the plurality of printing apparatuses, and the print target job is stored in another printing apparatus of the plurality of printing apparatuses that is different from the designated second printing apparatus,
      the designated second printing apparatus submits to the print server a request for deletion of the print target job stored in the other printing apparatus storing the print job, and
      when the print server receives the request for deletion of the print target job, the print server provides an instruction for deletion of the print target job for the other printing apparatus and the print server storing the print target job, and
   when the print target job is stored in the second designated printing apparatus of the plurality of printing apparatuses, and the print target job is not stored in another printing apparatus of the plurality of printing apparatuses,
      in response to deleting the print target job in the designated second printing apparatus, the designated second printing apparatus submits to the print server a request for deletion of the print target job stored in the print server, and
      when the print server receives the request for deletion of the print target job, the print server deletes the print target job.

2. The printing system according to claim 1, wherein
   the print control apparatus sends the print job to a target printing apparatus of the plurality of printing apparatuses,
   the target printing apparatus stores in the target printing apparatus per se the print job received from the print control apparatus and sends the print job to the print server, and
   the print server stores in the print server per se the print job received from the target printing apparatus.

3. The printing system according to claim 2, wherein
   the print server generates an in-server print job list that is a list of the print job received from the target printing apparatus and stores the in-server print job list in the print server per se, and
   the printing apparatus serving as the designated printing apparatus obtains from the print server the in-server print job list, generates, in accordance with the obtained in-server print job list, a print job designation list for designating the print target job, and presents the generated print job designation list to a user.

4. The printing system according to claim 3, wherein the printing apparatus serving as the designated printing apparatus presents to the user the print job designation list in a manner in which the print job stored in the printing apparatus and the print job not stored in the printing apparatus are distinguished from each other.

5. The printing system according to claim 3, wherein identification information for identifying a particular user is attached to the print job, the printing apparatus serving as the designated printing apparatus performs user authentication in accordance with information obtained from a user, and when the user authentication succeeds, the printing apparatus serving as the designated printing apparatus presents to the user a print job designation list for the user as the print job designation list, the print job designation list for the user being formed by extracting from the in-server print job list the print job to which the identification information corresponding to the authenticated user is attached.

6. The printing system according to claim 2, wherein the print server sends, to another printing apparatus other than the target printing apparatus of the plurality of printing apparatuses, print job storing information in which job-related information of the print job received from the target printing apparatus and information for identifying the target printing apparatus are associated with each other, the other printing apparatus that received the print job storing information generates a first print job list in accordance with the received print job storing information and records the first print job list in the other printing apparatus per se, and when the print target job is not stored in the designated printing apparatus and the print target job is not obtained from the print server, the designated printing apparatus presents to a user, in accordance with the first print job list, information for specifying the one printing apparatus storing the print target job.

7. The printing system according to claim 6, wherein the printing apparatus serving as the designated printing apparatus presents to the user, as the print job designation list for designating the print target job, a first print job designation list based on the first print job list and a second print job designation list of the print job stored in the printing apparatus serving as the designated printing apparatus per se.

8. A printing apparatus among a plurality of printing apparatuses, the printing apparatus comprising:
a control unit; and
a printing unit, wherein
when the control unit receives a print job from a print control apparatus, the control unit stores the received print job in the printing apparatus, sends the received print job to a print server to cause the print server to store the received print job, and
when a print target job targeted for printing is designated among print jobs, each being the print job stored in the print server and the printing apparatus,
in a case in which the print target job is stored in the printing apparatus per se, the control unit causes the printing unit to print in accordance with the print target job stored in the printing apparatus; and
in a case in which the print target job is not stored in the printing apparatus per se, the control unit obtains from the print server the print target job stored in the print server and causes the printing unit to print in accordance with the obtained print target job,
when the print target job is not stored in the printing apparatus, and the print target job is stored in another printing apparatus of the plurality of printing apparatuses that is different from the printing apparatus, the printing apparatus submits to the print server a request for deletion of the print target job stored in the other printing apparatus storing the print job, causing the print server to delete the print target job stored at the print server and to generate an instruction for deletion of the print target job for the other printing apparatus, and
when the print target job is stored in the printing apparatus, and the print target job is not stored in another printing apparatus of the plurality of printing apparatuses, in response to deleting the print target job stored in the printing apparatus, the printing apparatus submits to the print server a request for deletion of the print target job stored in the print server, causing the print server to delete the print target job.

9. A method for controlling a printing system including a print control apparatus that generates a print job, a print server, and a plurality of printing apparatuses, wherein the print job generated by the print control apparatus is stored in a printing apparatus of the plurality of printing apparatuses and the print server, on a designated printing apparatus that is a printing apparatus of the plurality of printing apparatuses, a print target job targeted for printing is designated among one or more print jobs stored in the print server and the printing apparatus storing the print job, the one or more print jobs each being the print job, when the print target job is stored in a designated first printing apparatus of the plurality of printing apparatus, the designated first printing apparatus prints in accordance with the print target job, when the print target job is not stored in the designated first printing apparatus of the plurality of printing apparatus, the designated first printing apparatus obtains from the print server the print target job stored in the print server and prints in accordance with the obtained print target job, when the print target job is not stored in a second designated printing apparatus of the plurality of printing apparatuses, and the print target job is stored in another printing apparatus of the plurality of printing apparatuses that is different from the designated first printing apparatus, the designated second printing apparatus submits to the print server a request for deletion of the print target job stored in the other printing apparatus storing the print job, and when the print server receives the request for deletion of the print target job, the print server provides an instruction for deletion of the print target job for the other printing apparatus and the print server storing the print target job, and when the print target job is stored in the second designated printing apparatus of the plurality of printing apparatuses, and the print target job is not stored in another printing apparatus of the plurality of printing apparatuses, in response to deleting the print target job in the designated second printing apparatus, the designated second printing apparatus submits to the print server a request for deletion of the print target job stored in the print server, and when the print server receives the request for deletion of the print target job, the print server deletes the print target job.

\* \* \* \* \*